United States Patent
Tarlano et al.

(10) Patent No.: US 10,713,109 B2
(45) Date of Patent: Jul. 14, 2020

(54) METHOD AND SYSTEM FOR PREDICTING FAILURE EVENTS

(71) Applicant: Apple Inc., Cupertino, CA (US)

(72) Inventors: Anthony J. Tarlano, Santa Clara, CA (US); Nikhil A. Desai, San Francisco, CA (US); Chandrasekaran Jagadeesan, Sunnyvale, CA (US); Subash Sundaresan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 15/859,189

(22) Filed: Dec. 29, 2017

(65) Prior Publication Data

US 2019/0102244 A1    Apr. 4, 2019

Related U.S. Application Data

(60) Provisional application No. 62/566,278, filed on Sep. 29, 2017.

(51) Int. Cl.
*G06F 11/00* (2006.01)
*G06F 11/07* (2006.01)
(Continued)

(52) U.S. Cl.
CPC ........ *G06F 11/0793* (2013.01); *G06F 9/3861* (2013.01); *G06F 9/542* (2013.01);
(Continued)

(58) Field of Classification Search
CPC ............ G06F 11/0793; G06F 11/0787; G06F 11/0751; G06F 9/3861; G06F 9/542; G06N 5/022
(Continued)

(56) References Cited

U.S. PATENT DOCUMENTS 7,343,529 B1    3/2008 Klinkner et al.
7,702,966 B2    4/2010 Chandwani et al.
(Continued)

OTHER PUBLICATIONS

Wikipedia MBR page, retrieved from https://en.wikipedia.org/wiki/Memory_buffer_register (Year: 2019).*
(Continued)

*Primary Examiner* — Yair Leibovich
(74) *Attorney, Agent, or Firm* — Jaffery Watson Mendonsa & Hamilton LLP

(57) ABSTRACT

Embodiments described herein provide a predictive failure analysis that enables design-time error and exception handling techniques to be supplemented or assisted by a predictive failure analysis system. One embodiment provides an electronic device, comprising a non-transitory machine-readable medium to store instructions; one or more processors to execute the instructions; and a memory coupled to the one or more processors, the memory to store the instructions which, when executed by the one or more processors, cause the one or more processors to receive injection of dynamic error detection logic into the instructions, the dynamic error handling logic including an error handling update to indicate a response to a predicted failure; receive a set of events indicative of the predicted failure; and respond to the set of events according to the error handling update.

24 Claims, 15 Drawing Sheets

(51) Int. Cl.
*G06F 9/38* (2018.01)
*G06N 5/02* (2006.01)
*G06F 9/54* (2006.01)
*G06N 20/00* (2019.01)

(52) U.S. Cl.
CPC ...... *G06F 11/0751* (2013.01); *G06F 11/0787* (2013.01); *G06N 5/022* (2013.01); *G06N 20/00* (2019.01)

(58) Field of Classification Search
USPC .......................................................... 714/48
See application file for complete search history.

(56) References Cited

U.S. PATENT DOCUMENTS

| | | |
|---|---|---|
| 8,082,471 B2 | 12/2011 | Khan |
| 8,386,401 B2 | 2/2013 | Virkar et al. |
| 8,924,938 B2 | 12/2014 | Chang et al. |
| 9,582,408 B1 | 2/2017 | Jayaraman et al. |
| 10,453,572 B1 * | 10/2019 | Brooks ................... G16H 40/63 |
| 2002/0184363 A1 * | 12/2002 | Viavant ................... H04L 29/06 709/224 |
| 2013/0097304 A1 * | 4/2013 | Asthana ............... H04L 41/5025 709/224 |
| 2017/0116061 A1 | 4/2017 | Patra et al. |
| 2017/0161182 A1 | 6/2017 | Yoshida et al. |
| 2017/0186034 A1 * | 6/2017 | Mace ................... G06F 9/45558 |
| 2018/0129492 A1 * | 5/2018 | Singh ........................ G06F 8/65 |

OTHER PUBLICATIONS

Wikipedia Knowledge base page, retrieved from https://en.wikipedia.org/wiki/Knowledge_base (Year: 2019).*

Gegick et al., "Toward Non-Security Failures as a Predictor of Security Faults and Failures", 15 pages, Feb. 4, 2009.

Nagappan et al., "Static Analysis Tools as Earely Indicators of Pre-Release Defect Density", 8 pages, May 2005.

Alhazmi et al., "Measuring, Analyzing and Predicting Security Vulnerabilities in Software Systems", Science Direct, Computers & Security (2006), doi:10.1016/j.cose.2006.10.002, 10 pages.

* cited by examiner

METHOD AND SYSTEM FOR PREDICTING FAILURE EVENTS

CROSS-REFERENCE

This application claims priority to U.S. Provisional Patent Application No. 62/566,278 filed Sep. 29, 2017, which is hereby incorporated herein by reference.

TECHNICAL FIELD

This disclosure relates generally to the field of software development. More specifically, this disclosure relates to a system and associated methods for predicting software failure events.

BACKGROUND

Software developers are often tasked with maintaining existing software applications or systems by adding new functionality or fixing bugs (e.g., defects) within software code that provides existing functionality. As a development project proceeds in time, the amount and frequency of changes may increase. Such changes can be considered to increase the "entropy" of the software. As software entropy increases, the design structure of the software becomes more complex, which may result in an increase in the number of failures associated with the software. Testing and validation operations can be performed on software to detect software defects before product launch. However, some failures may arise due to interoperability faults between multiple software modules that, individually, do not exhibit any apparent defects.

Software modules can be configured to dynamically respond to the runtime occurrence of some errors or faults via an exception handling system. An exception is an anomalous or exceptional condition that may require special handling by the software module. Such special handling can include changing the flow of program execution to run a specific set of software routines that are associated with the occurrence of a specific exception. The specific type of error or exception handling that is implemented within a software module can vary based on the underlying programming language and programming module in use.

Error and exception handling in library-based applications has historically been restricted to using only design-time techniques that make use of explicitly defined exception declarations. A developer with knowledge of a potential error or exception can include software instructions to identify and raise potential exceptions, with additional software instructions that can catch and handle such exceptions. However, with the introduction of service-oriented technologies, including micro-services, continuous integration (CI), continuous delivery (CD), containerization, virtualization, and cloud-computing, applications are increasingly being developed as application services that are compositions of local software and distributed services. Such complex systems can make the design-time error and exception handling techniques insufficient to anticipate the many types of errors and exceptions that may occur at runtime.

SUMMARY

Embodiments described herein provide a predictive failure analysis method and service that enables design-time error and exception handling techniques to be supplemented or assisted by a predictive failure analysis system. In some embodiments, the predictive failure analysis system enables the dynamic injection of software routines into error and event handlers to enable the error and event handlers to respond to potential software failures without requiring software developers to have anticipated such errors at design time.

One embodiment provides an electronic device, comprising a non-transitory machine-readable medium to store instructions; one or more processors to execute the instructions; and memory coupled to the one or more processors, the memory to store the instructions which, when executed by the one or more processors, cause the one or more processors to receive injection of dynamic error detection logic into the instructions, the dynamic error detection logic including a failure predictor to publish a failure prediction based on a stream of observed events on the electronic device.

One embodiment provides for a non-transitory machine-readable medium storing instructions which, when executed by one or more processors of an electronic device, cause the one or more processors to perform operations comprising storing an input event as a candidate for failure event analysis; detecting a predictive failure trend in stored input event log data; generating a plurality of predicted tables of failure knowledge data; mapping a predictive failure trend to the plurality of predicted tables; and issuing a failure event to an observer in response to detection of a match between the predictive failure trend and the failure knowledge data.

One embodiment provides for a data processing system comprising one or more processors; and a memory coupled to the one or more processors, the memory storing instructions which, when executed by the one or more processors, cause the data processing system to perform operations to receive injection of dynamic error detection logic into the instructions, the dynamic error handling logic including an error handling update to indicate a response to a predicted failure; receive a set of events indicative of the predicted failure; and respond to the set of events according to the error handling update.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Embodiments described herein provide a predictive failure analysis (PFA) method and service that allows design-time error and exception handling techniques to be supplemented or assisted by a predictive failure analysis system that allows the dynamic injection of software routines that can predict and respond to potential software failures.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

It should be noted that there can be variations to the flow diagrams or the steps (or operations) described therein without departing from the embodiments described herein. For instance, the steps can be performed in parallel, simultaneously, a differing order, or steps can be added, deleted, or modified.

Figure 1A:
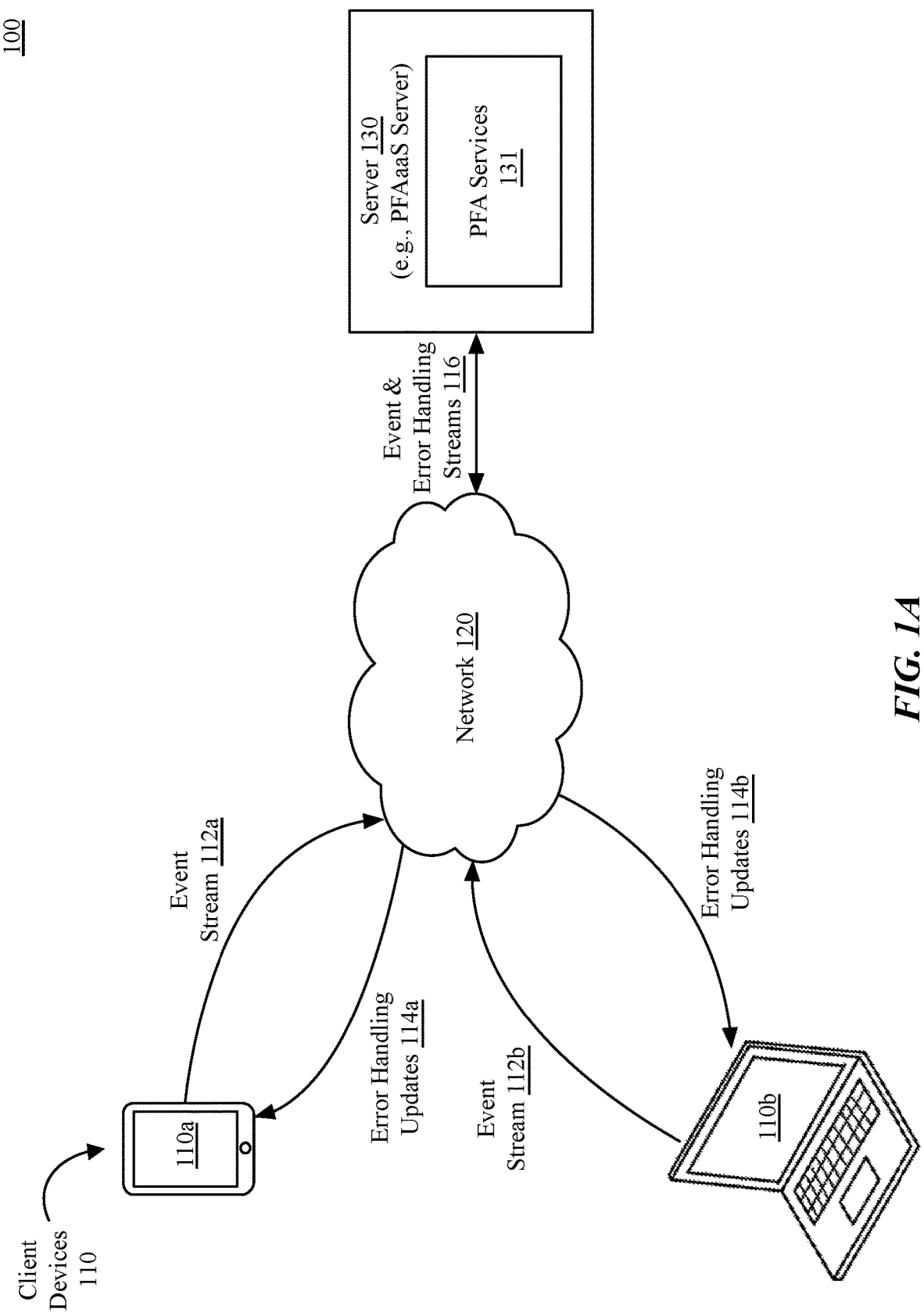
FIGS. 1A-1B are block diagrams illustrating a predictive failure analysis system, according an embodiment of the disclosure.
Figure 1B:
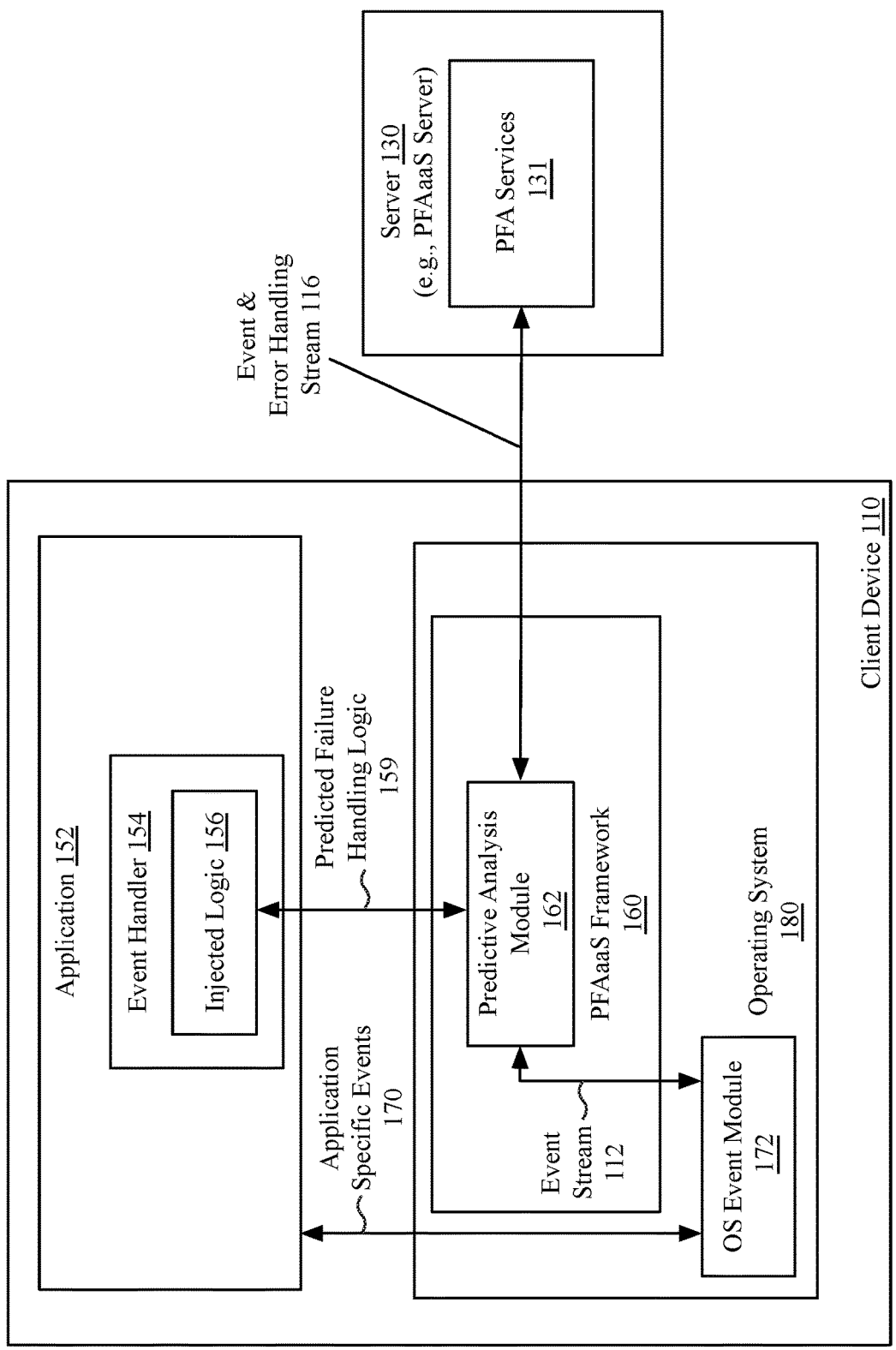

FIGS. 1A-1B illustrate a system 100 to facilitate runtime error handling injection into deployed software, according to an embodiment. As shown in FIG. 1A, the system 100 can include client devices 110a-110b (collectively, client devices 110) and a server 130, which each can couple via a network 120. The client devices 110 can be, for example, smartphone or tablet computing devices (e.g., client device 110a) or laptop computing devices (e.g., client device 110b). Additionally, the client devices 110 can also include desktop or workstation devices. The client devices 110 can also be a wearable device such as a smartwatch device, a television set top box, a connected smart home device, or other similar devices. In one embodiment, a connected smart home device can include a smart speaker device or a connected appliance, such as a smart thermostat or refrigerator device. In one embodiment, the client devices 110 can also include smart security devices, such as a smart camera device or a network connected alarm system.

The network 120 can be any suitable type of wired or wireless network such as a local area network (LAN), a wide area network (WAN), or combination thereof. A LAN can be implemented using various network connection technologies such as, but not limited to Ethernet, wireless LAN (e.g., Wi-Fi), and/or wireless personal area networks (WPAN). LAN communication over the network 120 can be performed using network protocols such as, but not limited to transmission control protocol (TCP) and Internet protocol (IP). A WAN can be implemented over various physical layer types including fiber-optic and copper cabling using protocols such as, but not limited to synchronous optical networking (SONET) and synchronous digital hierarchy (SDH).

The server 130 can be any kind of server or a cluster of servers, including a cloud-based server. The server 130 can be a physical server or a virtual server within a virtual server infrastructure. The server 130 can also make use of a third-party service provider that provides the underlying computing resources and/or infrastructure resources. In one embodiment the server 130 provides a set of services that are exposed only to internal developers within a software and/or hardware development organization. In one embodiment, the server 130 can also provide external facing services that can be accessed by third party developers.

In the embodiments described herein, the server 130 includes logic to provide a predictive failure analysis as a service (PFAaaS) system that can communicate with software applications that execute on the client devices 110. Developers of such software can subscribe to PFAaaS at design-time or runtime, enabling the software on the client devices 110 to be asynchronously notified to real-time and ahead-of-time failure predictions. PFAaaS modules within software on the client devices 110 can interact with predictive failure analysis (PFA) services 131 on the server 130 through the network 120. The client devices 110 can send observable event streams 112a-112b to the server 130. Observable event streams can be used as input to a prediction function. The prediction function can generate an output event stream of predictions that observers can use to handle "ahead-of-time" failure predictions.

Various software modules are provided by embodiments described herein. Unless otherwise noted, a module or software module is a process, thread, or section of software instructions that are executable on one or more processors.

In various embodiments, an event stream 112a-112b includes a series of observable events occurring on the client devices 110, where an event is an action or occurrence that is recognized by software processes on a system. Events include asynchronous external activities that can be received by program code executing on the client devices 110. An event can be a request that is to be processed or otherwise handled, or can be an informational event as to an applications status or activities. Exemplary events include interface input events such as mouse, touch, or keyboard events. Events can also include network events, such as receiving data via a network interface. For example, a wake-on-LAN event can cause a computing device that is in a low power state to transition to an operational state. Additional events can include messages received via an inter-process communication interface, sensor data received from an embedded or connected sensor, or device-driver events associated with an internal device. For example, data received from an ambient light sensor can cause an event handler to call a color compensation routine or adapt a backlight intensity. Events can also include exceptions or interrupt events that are received by hardware or handled within software. Software applications that execute on the client devices 110 can have event driven processes performed within an event loop. The software application can continue such event loop until terminated. Events can be actions that originate externally from the software system and are handled by software on the device. For example, user interactivity with a user interface of the client device 110 via interface hardware of the device and trigger a series of events that are handled by user interface software on the client device 110. Events also include actions that are generated or triggered by a software component within a device. Such actions can be handled by other software components within the system. For example, an event can be a status or error message transmitted between a software application and/or shared libraries on a client device 110, a status or error message transmitted between frameworks and an operating system of the client device, status information with respect to the hardware of a client device, or other actions that occur within the event framework of software executing on the client device 110.

Within the event loop, an application can fetch or receive events, then dispatch the fetched or received events to an appropriate event handler. The event handler can perform processing operations based on input associated with the event. The appropriate event handler for an incoming event can be a runtime added event handler that has been added to handle a predicted event.

The server 130 can maintain multiple event and error streams 116 with numerous client devices. PFA services 131 on the server can analyze, and learn from, the event streams 112a-112b from the client devices 110 and predict an opportunity to provide error or exception handling updates 114a, 114b to the client devices 110. The error or exception handling updates 114a, 114b can include, but are not limited to, impending or potential errors, failures, or exceptions that the software on the client devices 110 may observe. The error handling updates 114a, 114b can also include the injection of new exception or error handling code to handle impending or potential errors, failures or exceptions.

One embodiment enables software on the client devices 110 to subscribe to PFA services 131 via representational state transfer (REST) service application programming interfaces (APIs) that can be implemented over the network 120, although specific implementations can vary across embodiments. The PFA services 131 enables developers of distributed applications to shift away from using only design-time knowledge of explicit failure declarations, identification, and handling, toward using real-time and ahead-of-time predicted errors and exceptions. The real-time and ahead-of-time errors and events can be handled dynamically by applications as a new class of failure events.

As shown in FIG. 1B, a client device 110, which can be any of client device 110a-110b, can execute an application 152 having an event handler 154. The event handler 154 is configurable to handle application specific events 170 received from an operating system (OS) event module 172 within an operating system 180 of the client device 110. The event handler 154 can manage the received application specific events 170 in a manner directed by the designer of the application 152.

In embodiments described herein, the event handler 154 can also receive injected logic 156, which includes predicted failure handling logic 159 received from a predictive analysis module 162 in a PFAaaS framework 160. The injected logic 156 can enable the application to observe and handle predicted events, including failure and error events, that were not included at design time of the application. The PFAaaS framework 160 can be a framework provided by the operating system 180 to facilitate dynamic error handling as described herein. In one embodiment, logic injection describes a technique in which a first software object provides instructions, code, or logic to a second software object, without requiring the provided logic to be directly built or discovered by the software application having the second software object. The first object (e.g., an object within the predictive analysis module), can provide an error handling object that can be incorporated as a service into the event handler 154. The predicted event handler 154 can be configured to call the injected logic 156 in response to one or more received application specific events 170, with the specifics of the incorporated objects (e.g., injected logic 156) learned and predicted by the predictive analysis module 162. The injected logic 156 can execute the predictive failure handling logic 159 within the injected logic 156 to handle one or more predicted failure events within the stream of application specific events 170.

The predictive analysis module 162 can receive an event stream 112 from the OS event module 172. The event stream 112 can include events for the application 152 (e.g., application specific events 170) as well as events for other applications, libraries, frameworks, etc., executing on the client device 110. The event stream 112 can also include a subset of hardware triggered events. An event and error stream 116 can be maintained between the predictive analysis module 162 and predictive failure analysis services (PFA services 131) on a predictive failure analysis server 130. The PFA services 131 can receive privatized event data from multiple instances of the client device 110 and provided periodic updates to logic within the predictive analysis module 162. The predictive analysis module 162 can include a machine learning algorithm that can be trained to generate prediction events (e.g., predicted failures) or to output event handlers to handle predicted events. The predictive analysis module can use the trained machine learning algorithm to output prediction events and/or event handlers based in observable events received as input.

The concepts illustrated in FIG. 1A-1B are high level overviews of the features provided by embodiments described herein. A more details description of the various embodiments is provided below.

Figure 2:
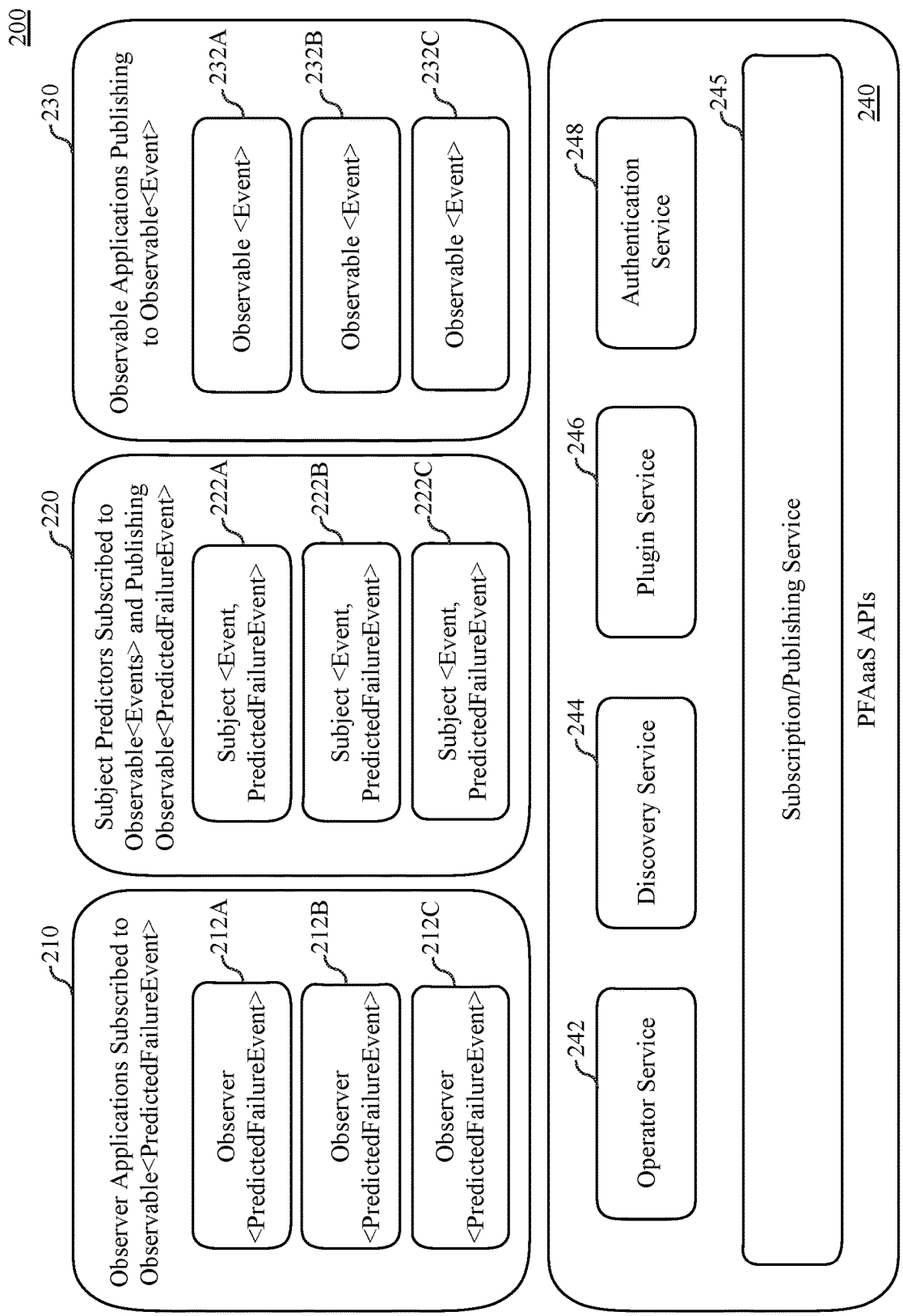
FIG. 2 illustrates a predictive failure analysis system, according to an embodiment.

FIG. 2 illustrates a predictive failure analysis system 100, according to an embodiment. In one embodiment software executing on a client device can be classified as observer applications 210, subject predictors 220, or observable applications 230. Observable applications 230 publish observable events 232A-232C. Observable events 232A-232C include actions and activities that are performed by various applications executing on the system. Exemplary observable events include I/O events, network events, device driver events, and/or hardware events. In one embodiment, the observable events 232A-232C include failure events that can be provided as inputs to subject predictors 220. The PFA system 100 provides an observable interface by which observable applications produce and push a streaming sequence of observable events 232A-232C to observers. In one embodiment, observable applications 230 can publish observable events 232A-232C to subscribers that are subscribed via the subscription/publishing service 245. Subject predictors 220 subscribe to observable events and publish observable predicted failure events. The subject predictors 220 can support both observable and observer interfaces. The specific events to which the subject predictors 220 subscribe and the specific published observable predicted failure events that are published can be determined by the developer of the subject predictor. Subject predictors 220, based on the subscribed events, can be configured to, for example, publish an event handler that can be executed in response to detection of a failure event that corresponds with a predicted failure event. Each subject 222A-222C can be both an observable and observer. A subject's observer can be a special observer that implements a predictor service by receiving events and outputting a tuple of <Event, PredictedFailureEvent>.

Event Observer applications 210 are software applications that have subscribed to asynchronous real-time and ahead-of-time failure predictions. Observer applications 210 include observers 212A-212C that subscribe to monitor predicted failure events, which can be published by subject predictors 220. The failure predictions, from a subscribing observer's point of view, represent streams of observable predicted failure events, which are ahead-of-time predictions created using machine learning algorithms and other technologies described herein. The observable predicted failure events can be predicted from event streams, such as event streams 112a-112b as in FIG. 1. Observer applications 210 can proactively address future failures in response to predicted failure event based on near real-time and historical errors and exceptions that were predicted by the PFA Server 130. In addition to acting as a publish/subscribe broker for sending and receiving failure events, observers 212A-212C can make use of a PFA operator library provided by the operator service 242 to compose, filter, select, and transform asynchronous observable failure events from one or more observable failure event sources.

The predictive failure analysis (PFA) system 100 provides PFAaaS APIs 240, which enable access to various PFA services that facilitate enable dynamic failure prediction and response within applications. In one embodiment the PFAaaS APIs 240 include an operator service 242, a discovery service 244, a plugin service 246, and an authentication service 248. A subscription/publishing service 245 enables subscriptions to the various services and facilitate the publishing of information via those services. In one embodiment, client device access to each of the PFAaaS APIs 240 can be facilitated via shared and/or runtime libraries that can be dynamically loaded or accessed by software on the client devices.

In one embodiment the PFAaaS APIs 240 can be accessed via standard REST service interfaces to provide streams of input values to subscribed applications (e.g., observer applications 210, subject predictors 220). The REST service interfaces can enable the stream of input values to be provided to predictors as sources of observable events 232A-232C and can allow a subscriber to receive predictions from predictors (e.g., subject predictors 220), when the subscriber is acting as an observer of prediction events (e.g., observer applications 210). A subject can be both an observer to other observable sources and an observable source to other observers. The use of subjects enables pipeline compositions of events, such as, for example, an Observable→Subject→Subject→Observer pipeline. A pipeline composition enables events to flow between observable and observer modules through a series of one or more subject modules.

In one embodiment the PFA system 100 enables the creation of an extensible service that allows programmers to create and plugin new predictors that contain additional machine learning algorithms to generate event prediction and/or event handlers. New subject predictors 220 can be added to the system as plugin predictors, which can be referred to predictor service instances. Such predictor service instances can be added to the system via the plugin service 246. In one embodiment the predictor service instances include both a specification of a learning/hypothesis function and a predictive model. The learning/hypothesis function and predictive model can be included within a plugin package. During normal operation, a predictor service instance will receive a stream of input event values from one or more event sources. The streams received maybe historical training data for bootstrapping the predictor service instance's predictive model or new real-time data for predicting failure events. Additionally, a discovery service 244 is provided to enable discovery of plugins that have been made available via the PFA system 200. The discovery service 244 enables a mechanism for runtime compositions and for using templates and metadata for finding the plugin that best provides a prediction capability for a subject. An authentication service 248 is provided to enable subscribers and/or publishers to be authenticated with the system. Providers of predictor service instances can include certificates or keys that identify the provider and enable the service instance to be authenticated by the authentication service 248. Once authenticated, predictor service instances can be discovered by the discovery service 244. In one embodiment, the authentication service 248 is also configured to apply one more authentication and verification mechanisms to any provided plugin before the plugin is enabled to execute or is enabled to inject error detection logic into subscribed programs.

Figure 3:
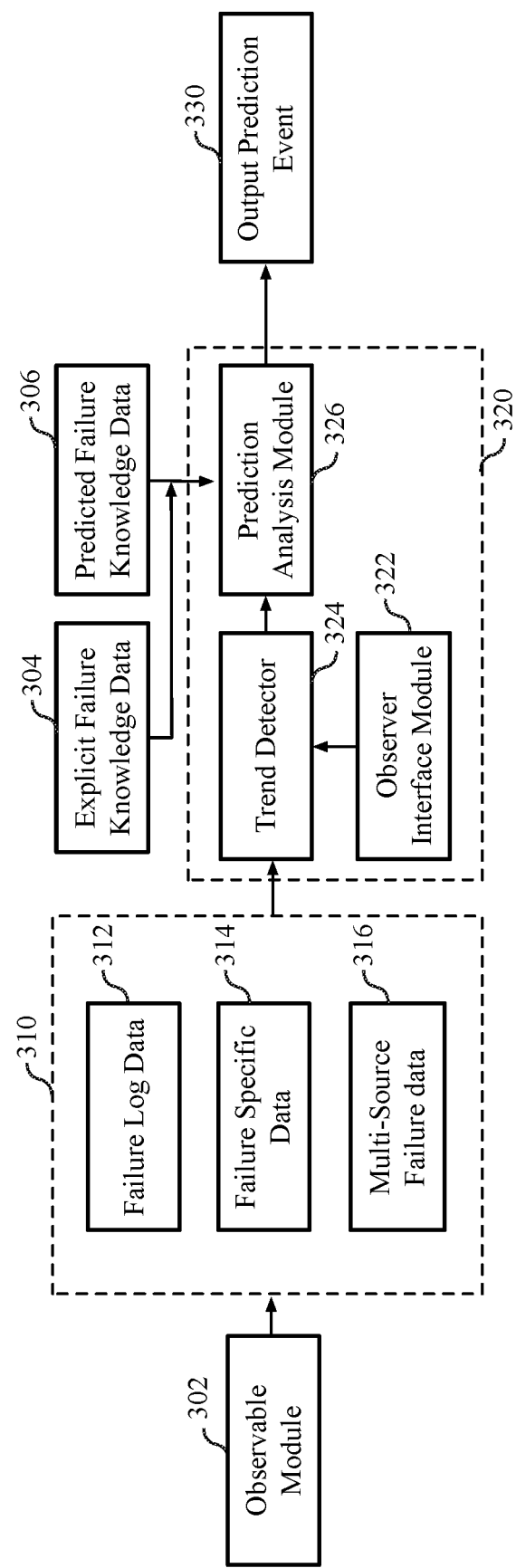
FIG. 3 illustrates a predictor service system, according to an embodiment.

FIG. 3 illustrates a predictor service system 300, according to an embodiment. In one embodiment, the predictor service system 300 can be implemented by a predictor service instance, which can receive observable events and generate predicted failure events based on a predictive model. The predictor service system 300 can be implemented by subject predictors 220 as in FIG. 2. The model of subscribing to observable streams of predicted failure events, originating from a predictor service instance, allows reactive software applications to observe the predictions and handle future failures moving beyond design-time error and exception handling. The reactive nature of the model is also particularly well suited for creating higher-order prediction service instances that are compositions of other prediction service failure events or compositions of prediction service instances with non-prediction event sources. Such compositions enhance the flexibility of the PFAaaS system to enable the use of the system with a broad set of applications, while maintaining the relative simplicity of the overall system. The reactive nature of the model is well suited because the data flow graph created by the pipeline composition of Observable→Subject→Observer can be easily mutated to have longer pipelines or to have tee structures where there is no global knowledge for the previous nodes in the pipeline composition.

In one embodiment, the predictor service system 300 receives event data from an observable module 302, which can be an observable application, process, or thread (e.g., observable application 230 as in FIG. 2). The observable module 302 outputs events that can be an event source for observers and subjects and may or may not implement a predictor service. Observable events are software or system events that are output by an observable module 302. Whether a module is observable can vary based on the type of module and the permission structure associated with the module. Not all event generating modules on a system are observable. For example, not all system events may be observed in real time by all processes. The observable module 302 can provide event data 310 including failure log data 312, failure specific data 314, and multi-source failure data 316. The event data 310 can be provided to a predictive model 320 that includes an observers interface module 322, a trend detector 324, and a prediction analysis module 326. Failure log data 312 can include a list of explicitly observed failure occurrences and associated environmental conditions that are logged by an application or event logging service on a device. In one embodiment, failure log data 312 can also include crash data, for example, a call stack associated with an observed software crash. In one embodiment, failure specific data 314 can include details that are related to specific failures that that have been observed. For example, and in one embodiment, failure specific data 314 can include a database or log of errors that are indexed according to specific failure identifiers. Given a specific failure identifier, failure specific data 314 can be queried to determine specific environmental conditions and system states that occur contemporaneously with a specific failure. Multi-source failure data 316 can include a list of failures that have been observed across multiple applications, domains, device types, and/or scenarios. Multi-source failure data 316 can highlight failures that can have multiple causes that may not initially correlate.

The event data 310 can be provided to a predictive model 320 that includes an observer interface module 322, a trend detector 324, and a prediction analysis module 326. In one embodiment, the observer interface module 322 provides an interface to observer applications, which can request or subscribe to data regarding predicted failure events. The observer interface module 322 can interface with the trend detector 324, which can analyze event data 310 to determine if trends can be detected within the event data 310. For example, the trend detector 324 can note an increase or decrease in failure related events for a specific software module or framework beginning with installation of a specific version of that software module or framework. In an additional example, the trend detector 324 can note that the occurrence of a certain failure event correlates with the presence of a certain removable module or device. Data from the trend detector 324 can be provide into the prediction analysis module 326 for further processing.

In one embodiment, the prediction analysis module 326 can be trained to predict future failures using a set of training data. In one embodiment, the prediction analysis module 326 can be trained based on explicit failure knowledge data 304, which is explicit historical data on past failures. The explicit failure knowledge data 304 can include failure preconditions and observed results associated with past failures. For example, a known error can occur such that given a set of known preconditions (e.g., performing a specific action on a specific device while the device is in a specific orientation), a known fault will occur (e.g., incorrect text rendering). This explicit failure knowledge data 304 can be supplemented using predicted failure knowledge data 306 that has been made available to the predictive model 320. Predicted failure knowledge data 306 can include a set of existing failure predictions that have been generated by the predictive model 320. For example, predicted failure knowledge data 306 indicate that applications that use a specific user interface framework may exhibit a specific set of issues under certain circumstances. The explicit failure knowledge data 304 and predicted failure knowledge data 306 can be used to train a predictor to, for example, recognize the possibility of text rendering errors occurring under certain conditions, even if such errors have not been explicitly reported.

Once the predictor service system 300, in a subject, has been trained, the associated predictor service instance can begin to receive input event values (e.g., event data 310) that will be processed by the learning/hypothesis function, predictive model, and past experience within the prediction analysis module 326. The predictor service system 300 can then output a set of predicted failure events (e.g., output prediction event 330). The predicted failure events originating from a predictor service instance can be delivered to observers that have previously subscribed with the PFA system (e.g., observer applications 210 within PFA system 200 as in FIG. 2).

Figure 4:
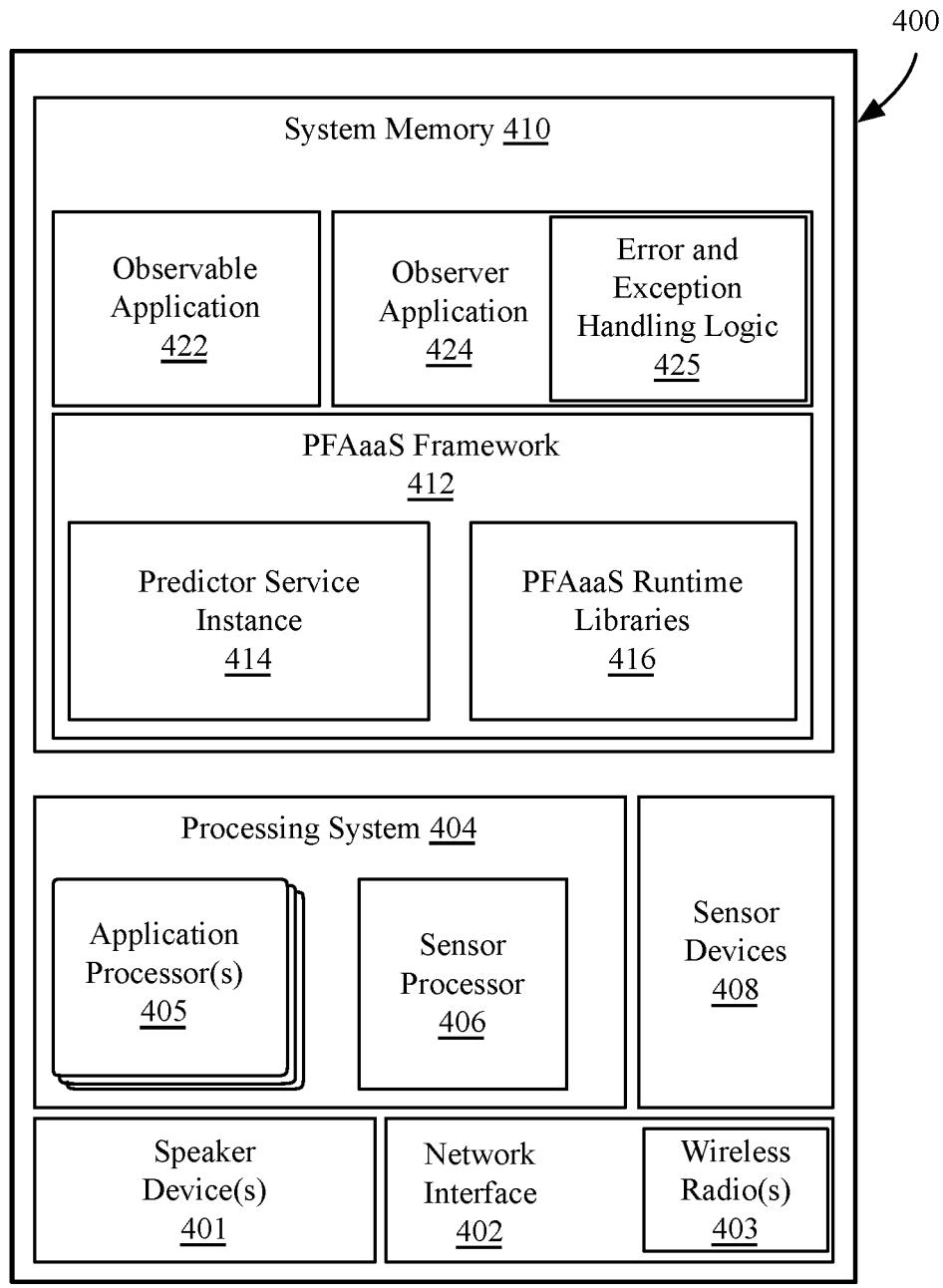
FIG. 4 is a block diagram of a client device, according to an embodiment.

FIG. 4 is a block diagram of a client device 400, according to an embodiment. The illustrated client device 400 can be any client device descried herein, such as but not limited to the client devices 110 of FIG. 1. The client device 400 can include one or more device speakers 401 to enable playback of the audio portion of media, alarm, alert, and/or notification that play on the client device 400. The client device 400 also includes a network interface 402, which can include one or more wireless radios 403 to enable wireless network connectivity. The one or more wireless radios 403 can couple with baseband processing logic that provides support for wireless networking protocols such as, but not limited to Bluetooth, Wi-Fi, near field communication (NFC), other wireless networking technologies. In some implementations, the network interface 402 may also support a wired network connection.

The computing device also includes a processing system 404 having multiple processor devices. In one embodiment the processing system 404 includes one or more application processor(s) 405 to execute instructions for user and system applications that execute on the computing device. The processing system can also include a sensor processor to process and monitor a suite of sensor devices 408 having sensors including, but not limited to motion sensors, light sensors, proximity sensors, biometric sensors, audio sensors (e.g., microphones), and image sensors (e.g., cameras). The sensor processor 406 can enable low-power monitoring of always-on sensors within the suite of sensor devices 408. The sensor processor 406 can allow the application processor(s) 405 to remain in a low power state when the client device 400 is not in active use while allowing the client device 400 to remain accessible via voice or gesture input to a virtual assistant or to incoming network data received via the network interface 402.

In one embodiment the client device 400 includes a system memory 410 which can be a system virtual memory having an address space that includes volatile and non-volatile memory. The system memory 410 can include a PFAaaS framework 412 that includes a predictor service instance 414 and PFAaaS runtime libraries 416. The system memory 410 can also include an observable application 422 and observer application 424. The observer application can include error and exception handling logic 425. The error and exception handling logic 425 can receive a stream of error predictions from, for example, a predictor service instance 414 within a PFAaaS framework 412. The observable application 422 can be a variant of the observable applications 230 of FIG. 2, and can publish observable events to the PFAaaS framework 412, which can be received by the PFAaaS runtime libraries 416 and routed to the predictor service instance 414. The PFAaaS runtime libraries 416 can also facilitate communication between the client device 400 and predictive failure analysis services on a remote server device (e.g., PFA services 131 on server 130, as in FIG. 1A).

In one embodiment, error and exception handling logic 425 can be adaptively configured based on input from a predictor service instance 414. The predictor service instance 414 can observe events published by the observable application and perform predictive error analysis based on the published events. The predictor service instance 414 can then publish a stream of predicted errors, which can be received by the error and exception handling logic 425, which can be dynamically adjusted based on the predicted errors. In one embodiment the error and exception handling logic 425 can receive error handling updates (e.g., error handling updates 114a, 144b as in FIG. 1), which can include the injection of new logic routines to handle errors or exceptions which were not anticipated during design time of the observer application 424.

Figure 5:
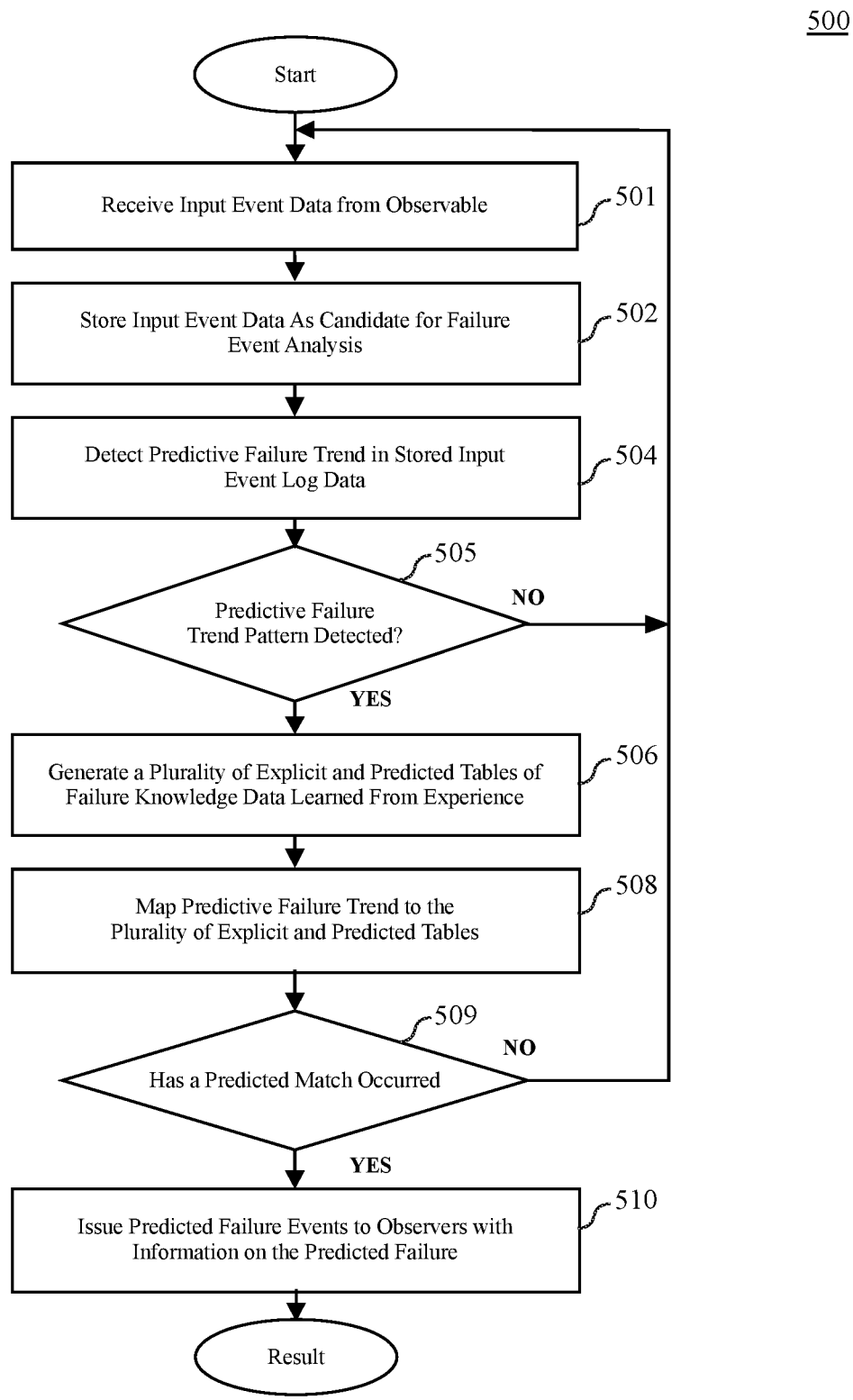
FIG. 5 is a flow diagram of a process to predict failure events at a predictor service instance, according to embodiments described herein

FIG. 5 is a flow diagram of a process 500 to predict failure events at a predictor service instance, according to embodiments described herein. The process 500 can be implemented via a predictor service instance that implements a predictor service system, such as the predictor service system 300 as in FIG. 3.

At block 501, the process 500 can receive input event data from an observable. The observable, in one embodiment, is an observable module 302 as in FIG. 3. The received input event can be received as part of an event stream. In one embodiment, the received event is selected from an event stream based on one or more filters.

At block 502, the process 500 can store input event data as a candidate for failure event analysis. Event data can be received via a subscription to an event stream (e.g., event stream 112 as in FIG. 1). The event stream can be produced by an observable module (e.g., observable module 302 as in FIG. 3). The observable module can be an observable application that publishes observable events. The observable events, in one embodiment, includes events that are dispatched to or received from other modules and applications within a system. In one embodiment, the input event data includes failure log data 312, failure specific data 314, and multi-source failure data 316 as in FIG. 3.

At block 504, the process 500 can detect a predictive failure trend in stored input event log data based on predictive criteria defined by the developer of the predictor service instance. The specific predictive technique can vary and is based on logic defined within the predictor service instance. For example, the detected predictive failure trend can be a hypothesis that a given failure event may have a specific set of preconditions or may have a specific cause.

At block 505 the process 500 can analyze the stored input event log data to determine whether a predictive failure trend pattern can be detected within the stored input event log data. The analysis can apply additional processing based on trained machine learning model which can determine if the predictive trend can be resolved into a failure prediction. If a predicted failure trend pattern has not been detected within the stored input event log data, the process 500 can return to block 501. If a predictive failure trend pattern has been found by analysis, for example, via a prediction analysis module 326 as in FIG. 3, the process 500 can proceed to block 506.

At block 506, the process 500 can generate a plurality of explicit and predicted tables of failure knowledge data learned from experience. Explicit predicted tables include a table or database of explicitly observed failure within a system. Predicted tables include data related to predictive failure trends that have been resolved into predicted failures by analysis. The generation and/or re-generation of the tables can occur periodically or in response to some trigger, but does not necessarily occur each time input event data is stored.

At block 508, the process 500 can map the predictive failure trend found at block 505 to the plurality of explicit and predicted tables to create a connection between patterns associated with the predictive failure trend with the explicit and predicted tables of failure knowledge. The mapping can be performed in part based on a trained machine learning model. The specifics of the machine learning model can vary from predictor to predictor based on the scope of the predictor and the training data supplied to the machine learning model.

At block 509, the process 500 can determine if a predicted match has occurred between the predicted failure trend and the received input event data. If a predicted match has not occurred, the process can return to block 501. If a predicted match has occurred, the process can proceed to block 510. The occurrence of a predicted match indicates, to some degree of confidence, that the identified predictive failure trend correlates with data within the explicit and predicted tables of failure knowledge data. In other words, some predicted failure event is likely to occur based on identified trends and existing failure knowledge data.

At block 510, process 500 can issue predicted failure events to observers or subjects. The predicted failure events can contain information on the predicted failure. The predicted failure events, in one embodiment, can include notifications regarding predicted failures, such as cause or preconditions that may lead to a failure. In one embodiment, the information related to the predicted failure includes logic to execute in response to an occurrence of the predicted failure.

Figure 6:
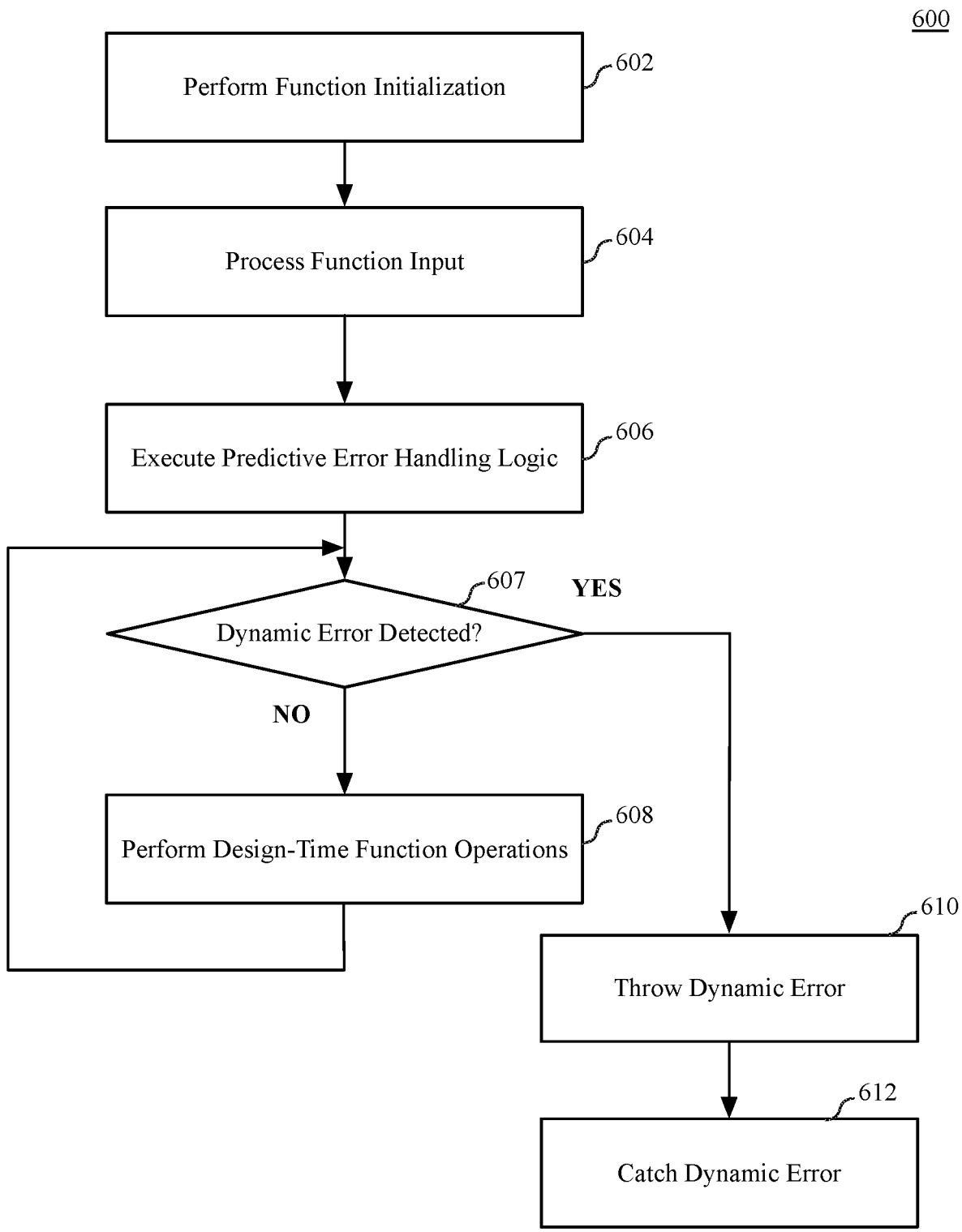
FIG. 6 is a flow diagram illustrating software logic configured for dynamic error handling, according to embodiments described herein.

FIG. 6 is a flow diagram illustrating software logic 600 configured for dynamic error handling, according to embodiments described herein. The logic 600 can enable dynamic error handling within an event handler for an application that subscribes to predicted failure events. In one embodiment, the logic 600 is or includes injected logic, such as the injected logic 156 within the event handler 154 illustrated in FIG. 1B. The software logic can execute on one or more processor devices as described herein, including but not limited to the processing system 404 of FIG. 4, where the logic 600 is or includes the error and exception handling logic 425 as in FIG. 4. The logic 600, in various embodiments, can be compiled machine code that can execute directly on a system, or can be high-level or intermediate level code that can be compiled before execution, for example, via a just-in-time (JIT) compiler. The software logic 600 can be accompanied by certificates or signatures that allow the logic to execute on a client device. In one embodiment, the software logic 600 can be encrypted code that is decrypted before or during execution.

As shown in FIG. 6, in one embodiment the logic 600 can perform function initialization for a program function within an application, as shown at block 602. For example, the logic 600 can initialize internal variables to enable the logic 600 to perform functions within an event handler.

At block 604, the logic 600 can process function input received via an input/output mechanism. The function input can be received via various sources including, but not limited to an input/output device, from software libraries associated with the logic 600, or from other processes via an inter-process communication mechanism enabled within the data processing system upon which the logic 600 executes.

At block 606, the logic 600 can execute predictive error handling logic, which can be performed to enable predictive error and exception handling based on input from a predictor service instance. The predictive error handling logic, in one embodiment, can include dynamically injected logic provided by a predictive failure analysis system as described herein. In one embodiment, the instruction code for the logic 600 can include signposts or decorations that indicate portions of the logic 600 in which error avoidance routes can be injected or dynamically executed.

If at block 607, the logic 600 does not detect a dynamic error, the logic 600 can perform one or more design-time function operations, as shown at block 608. The function operations can include the design-time functions of the logic 600 and can also include explicitly coded design-time error and/or exception handling routines to catch and handle errors or exceptions that were predicted at design time by developers of an application or process including the software logic 600. In one embodiment, the PFAaaS system can also be included in design-time operations. The logic 600 can be designed to explicitly request a specific version of a plugin subscription, for example, where a software application and a predictor plugin are co-developed.

If at block 607 a dynamic error is detected, in one embodiment the logic 600 can throw a dynamic error at block 610. In one embodiment, to throw an error indicates that an anomalous event has occurred and that the normal flow of execution cannot continue. In this case, the instructions to detect the occurrence of the anomalous event were not originally coded into the logic 600, but were injected as a result of predictive failure analysis. At block 612, the logic 600 can catch the dynamic error and execute logic provided to handle the error. Catching the dynamic error occurs within logic that responds to the thrown error. The catching logic can execute error handling logic in response to catching the error. Handling the error can include for example, causing a client device to quickly and gracefully fail in response to the error, where a graceful failure is considered a failure response that does not include an unexpected or unrecoverable application failure (e.g., crash) or a protracted period of unresponsiveness exhibited by a user interface of the application. Alternatively, handling the error can include to continue to function while error handling logic works around the error. Handling the error can also include continuing to function in a degraded state. In general, where a given section of program code is predicted to fail, it can be possible to bypass execution of that section of program code. Bypassing such code may temporarily result a degraded level of service, but may enable avoidance of more failures.

In addition to throwing and catching errors, as described above, other error handling or error avoidance techniques can be implemented by embodiments described herein. For example, and in one embodiment, if a predicted failure event is issued (e.g., at block 510 of FIG. 4) that indicates that a given function call of a shared library may fail, observers can be configured avoid use of such function call where possible, or defer the use of such function calls to a later time.

Figure 7:
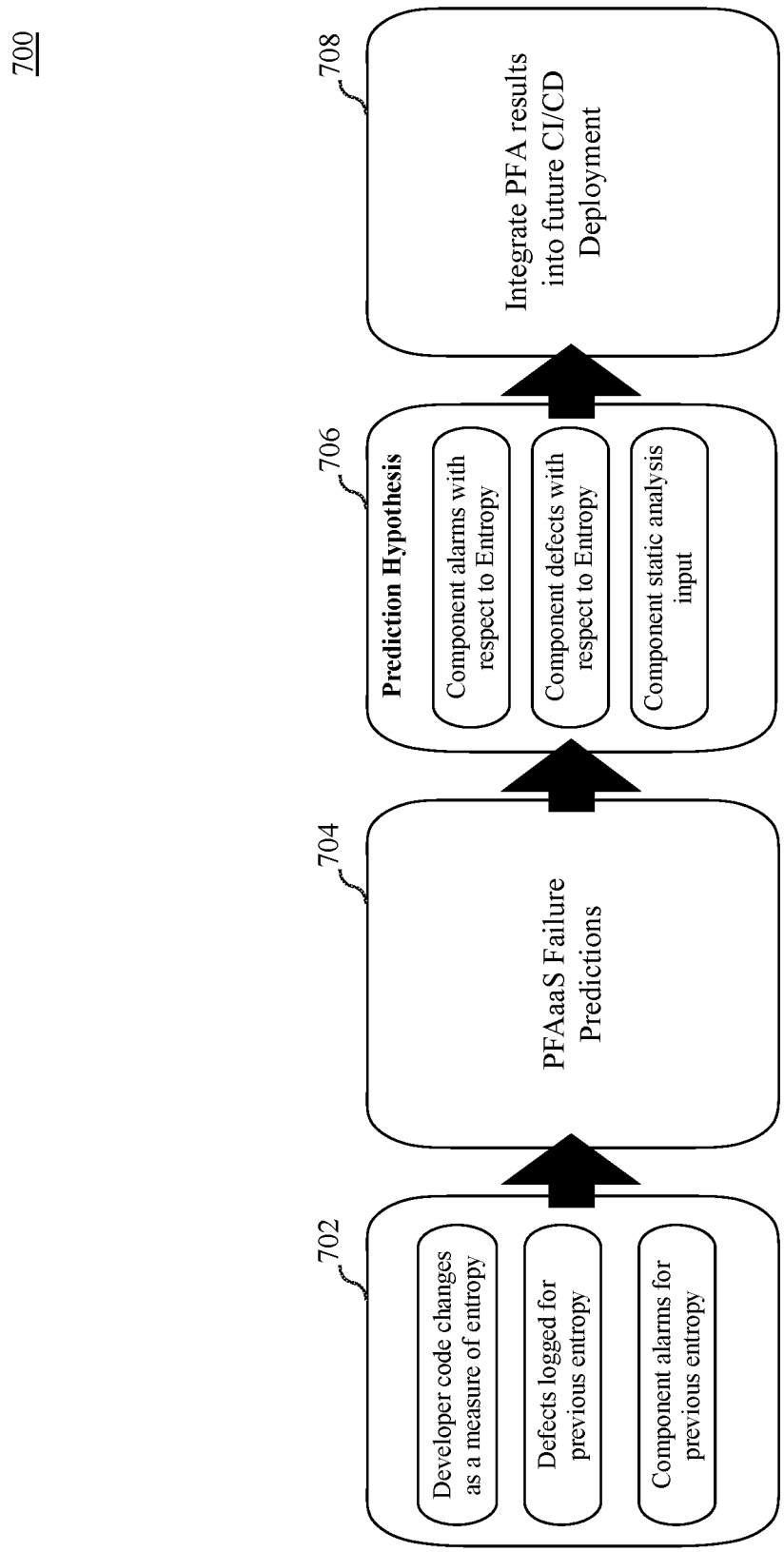
FIG. 7 is a block diagram of system hardware and software system for a multi-user computing device, according to an embodiment.

FIG. 7 illustrates a process 700 of predictive failure analysis based on codebase entropy, according to an embodiment. Codebase entropy can be considered along with other code analysis techniques such as code complexity and data flow analysis to determine the likelihood that a given section of software is likely to contain undiscovered defects. It is possible that, during some design cycles, sections of software that experience the most number of changes over a given period of time are more likely than other, less modified, portions of software to contain defects. In some embodiments, the PFAaaS system can be configured to take into account entropy, logged defects, and development environment alarms when developing failure predictions. Those failure predictions can then be integrated into the development cycle.

As shown at block 702, a set of input data including developer code changes as a measure of entropy, defects logged for a previous entropy, and component alarms for the previous entropy, where the previous entropy is set of previously integrated changes into a codebase. The input at block 702 can be provided to block 704, which integrates the input into PFAaaS failure predictions. The PFAaaS failure predictions at block 704 can output a prediction hypothesis at block 706. The prediction hypothesis, in one embodiment, is a prediction model that proposes that predicts whether a given section of the codebase is likely to experience errors of a specific type. The prediction hypothesis can make such predictions based on component alarms with respect to codebase entropy, component defects with respect to entropy, and/or component static analysis input. The prediction hypothesis at block 706 can be integrated at block 708, which integrates the predictive failure analysis results into future CI/CD (continuous integration/continuous development) deployment, to enable predicted failures to be investigated and addressed in a future development cycles. The predictive failure analysis results output from the prediction hypothesis at block 706, under some circumstances, can predict potential failures before those failures are identified during testing cycles. Additionally, the predictive failure analysis results may identify potential failures that may otherwise escape the current testing regime.

Predictive failure analysis as a service can be integrated into exemplary operating system frameworks and accessed via exemplary application programming interfaces as described below.

Exemplary Frameworks and Application Programming Interfaces

Figure 8A:
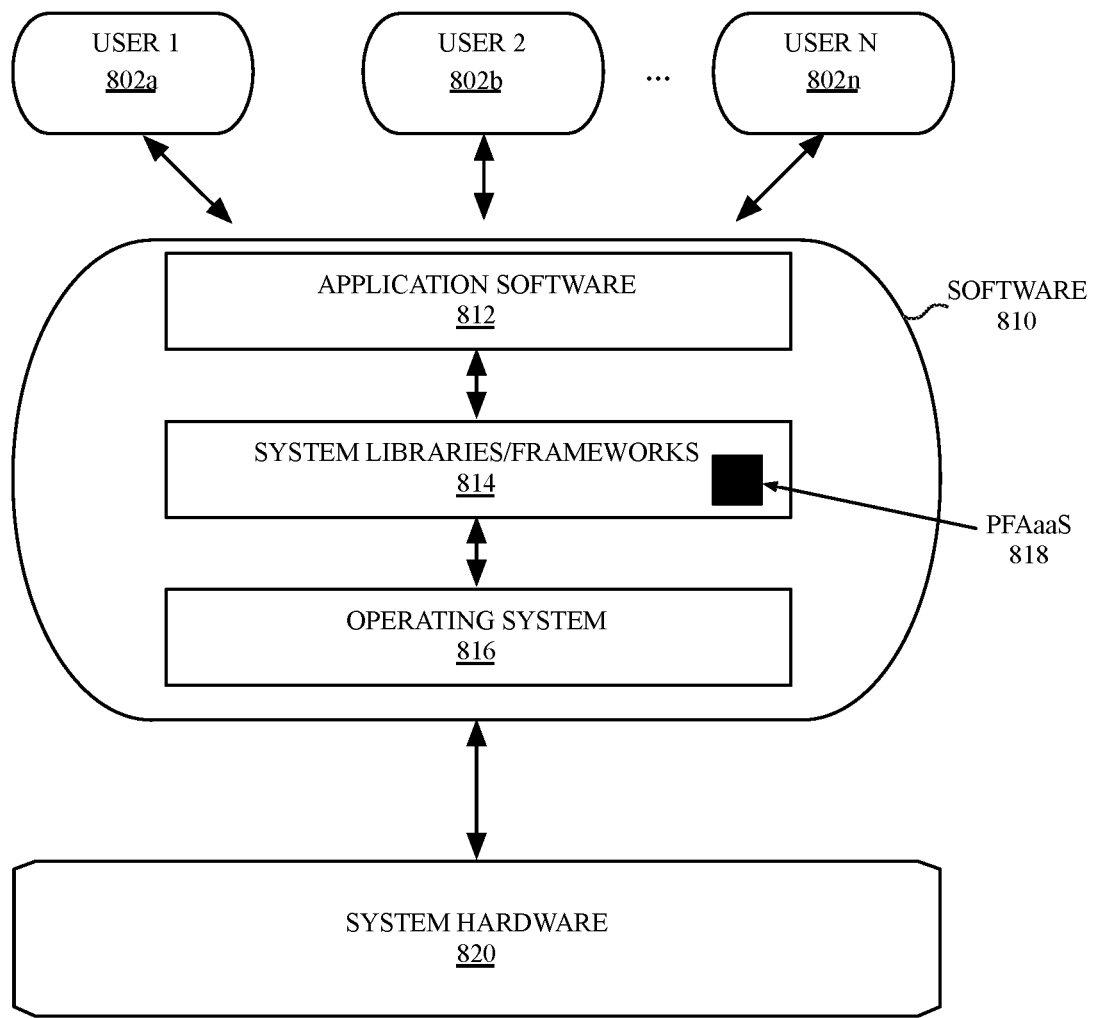
FIGS. 8A-8B are block diagrams of hardware and software systems for a multi-user computing device, according to an embodiment.
Figure 8B:
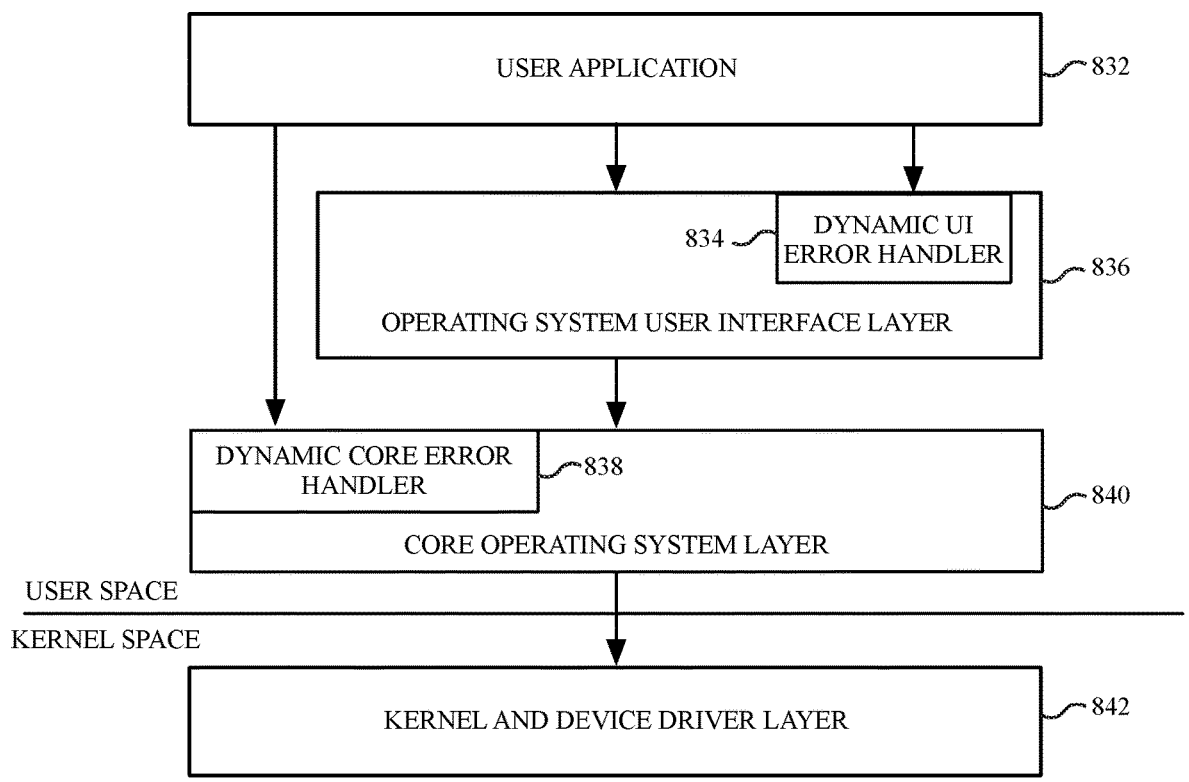

FIGS. 8A-8B are block diagrams of hardware and software systems for a multi-user computing device, according to an embodiment. FIG. 8A illustrates various software 810 and hardware 820 components of a data processing system 800 as described herein. The configured data processing system 800 provides support multi-user data processing for 1 to N users (e.g., User 1 802*a*, User 2, 802*b*, through User N 802*n*). The users can access application software 812 through a user interface provided by an operating system (OS) 816. The application software 812 can use system libraries or frameworks 814 as abstractions to functionality exposed by the core levels of the OS 816. The system libraries and frameworks 814 can include a PFAaaS framework 818 according to embodiments described herein.

FIG. 8B shows software architecture 830 for use by a data processing system, according to an embodiment. The various software components of the exemplary software architecture can be stored in a combination of volatile and non-volatile memory during the execution of the software components. When the components are not being executed, the components can be stored in non-volatile storage such as a magnetic hard drive or semiconductor memory (e.g., flash memory, etc.). The software components are illustrated with a division between user space and a kernel space. Although other arrangements are possible, user applications (e.g., user application 832), and some operating system components (e.g., operating system user interface layer 836, and core operating system layer 840) execute in user space. In kernel space, the operating system kernel and a set of device drivers operate in the kernel and device driver layer 842. The kernel and device driver layer 842 manage the underlying functionality of the overall operating system and provide a formalized and secure mechanism for user space software to access data processing system hardware.

The PFAaaS system provided by embodiments described herein can enable a dynamic UI error handler 834 that enables the operating system user interface layer 836 to handle error and software exceptions over and above those designed into the operating system user interface layer 836.

Underlying operating system functions that are not related to the user interface are performed in the core operating system layer 840. One or more data management frameworks can include a dynamic core error handler 838 that can dynamically handle errors based on a predictive failure analysis stream provided via the PFAaaS system.

The exemplary user application 832 may be any one of a plurality of user applications, such as a web browser, a document viewer, a picture viewer, a movie player, a word processing or text editing application, an email application, or other applications known in the art. The user application 832 can execute instructions loaded from UI application frameworks within the operating system user interface layer 836 to facilitate creation of graphical user interface objects such as icons, buttons, windows, dialogs, controls, menus, and other user interface elements and to perform window management functionality.

The core operating system layer 840 contains operating system components that implement features including and related to application security, system configuration, graphics and media hardware acceleration, and directory services. Multiple application frameworks can provide a set of APIs to enable a user application 832 to access core services that are essential to the application, but are not directly related to the user interface of the application. In one embodiment the dynamic core error handler 838 is part of a core app framework that can facilitate an application's access to database services, credential and security services, backup services, data synchronization services, and other underlying functionality that may be useful to an application. The core app framework, or equivalent application frameworks, can provide access to remote server based storage for functionality including synchronized document storage, key-value storage, and database services. Key-value storage can also be available, and can allow a user application 832 to share small amounts of data such as user preferences or bookmarks among multiple instances of the user application 832 across multiple client devices. The user application 832 can also access server-based, multi-device database solutions via the core operating system layer 840.

The systems and methods described herein can be implemented in a variety of different data processing systems and devices, including general purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 9:
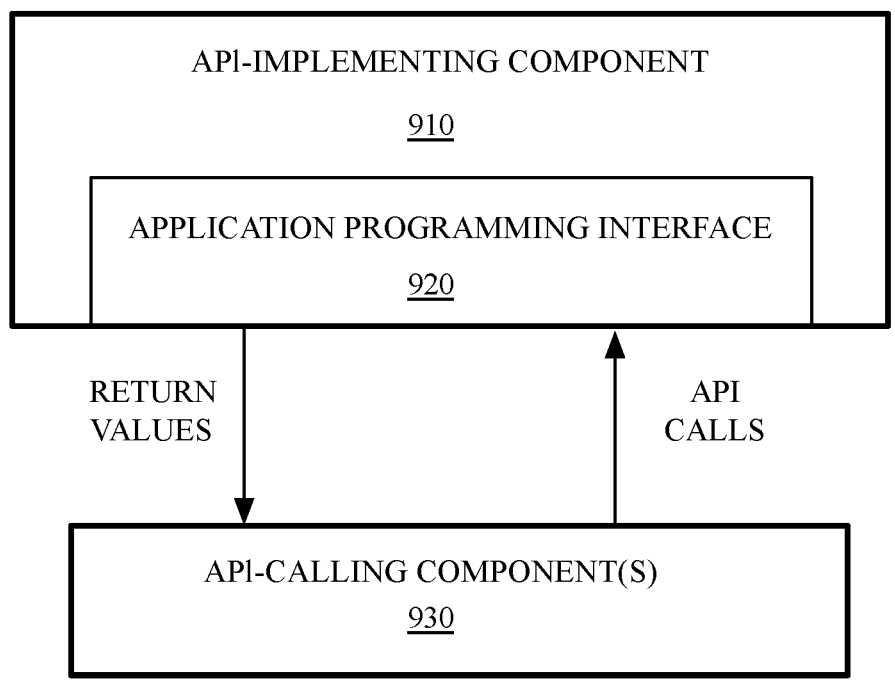
FIG. 9 is a block diagram illustrating an exemplary API architecture, which may be used in some embodiments.

FIG. 9 is a block diagram illustrating an exemplary API architecture, which may be used in some embodiments described herein. The API architecture 900 includes the API-implementing component 910 (e.g., an operating system, a library, a device driver, an API, an application program, software or other module) that implements the API 920. The API 920 specifies one or more functions, methods, classes, objects, protocols, data structures, formats and/or other features of the API-implementing component that may be used by the API-calling component 930. The API 920 can specify at least one calling convention that specifies how a function in the API-implementing component receives parameters from the API-calling component and how the function returns a result to the API-calling component. The API-calling component 930 (e.g., an operating system, a library, a device driver, an API, an application program, software or other module), makes API calls through the API 920 to access and use the features of the API-implementing component 910 that are specified by the API 920. The API-implementing component 910 may return a value through the API 920 to the API-calling component 930 in response to an API call.

It will be appreciated that the API-implementing component 910 may include additional functions, methods, classes, data structures, and/or other features that are not specified through the API 920 and are not available to the API-calling component 930. It should be understood that the API-calling component 930 may be on the same system as the API-implementing component 910 or may be located remotely and accesses the API-implementing component 910 using the API 920 over a network. While FIG. 9 illustrates a single API-calling component 930 interacting with the API 920, it should be understood that other API-calling components, which may be written in different languages (or the same language) than the API-calling component 930, may use the API 920.

The API-implementing component 910, the API 920, and the API-calling component 930 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 10A:
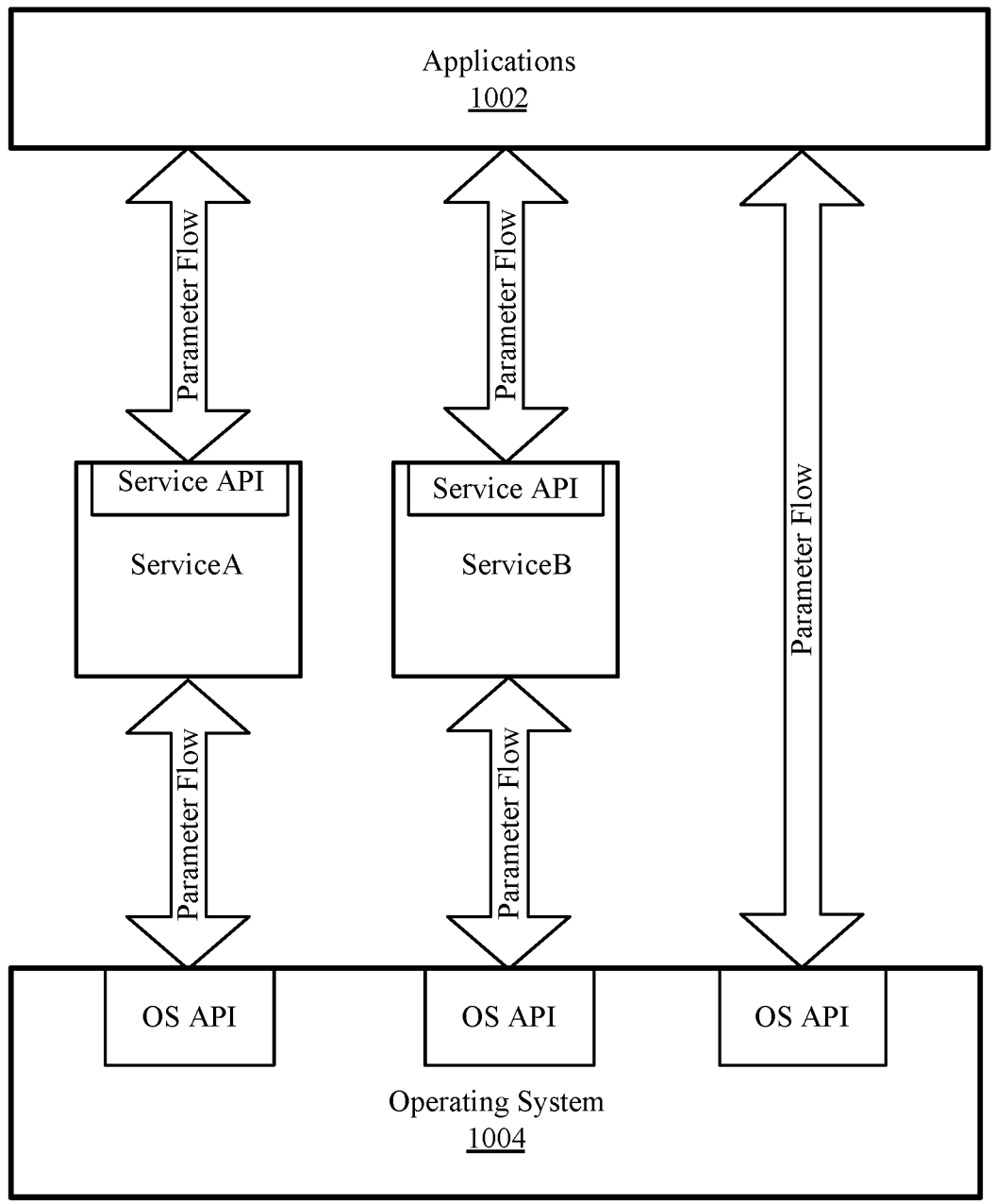
FIG. 10A-10B are block diagrams of exemplary API software stacks, according to embodiments.
Figure 10B:
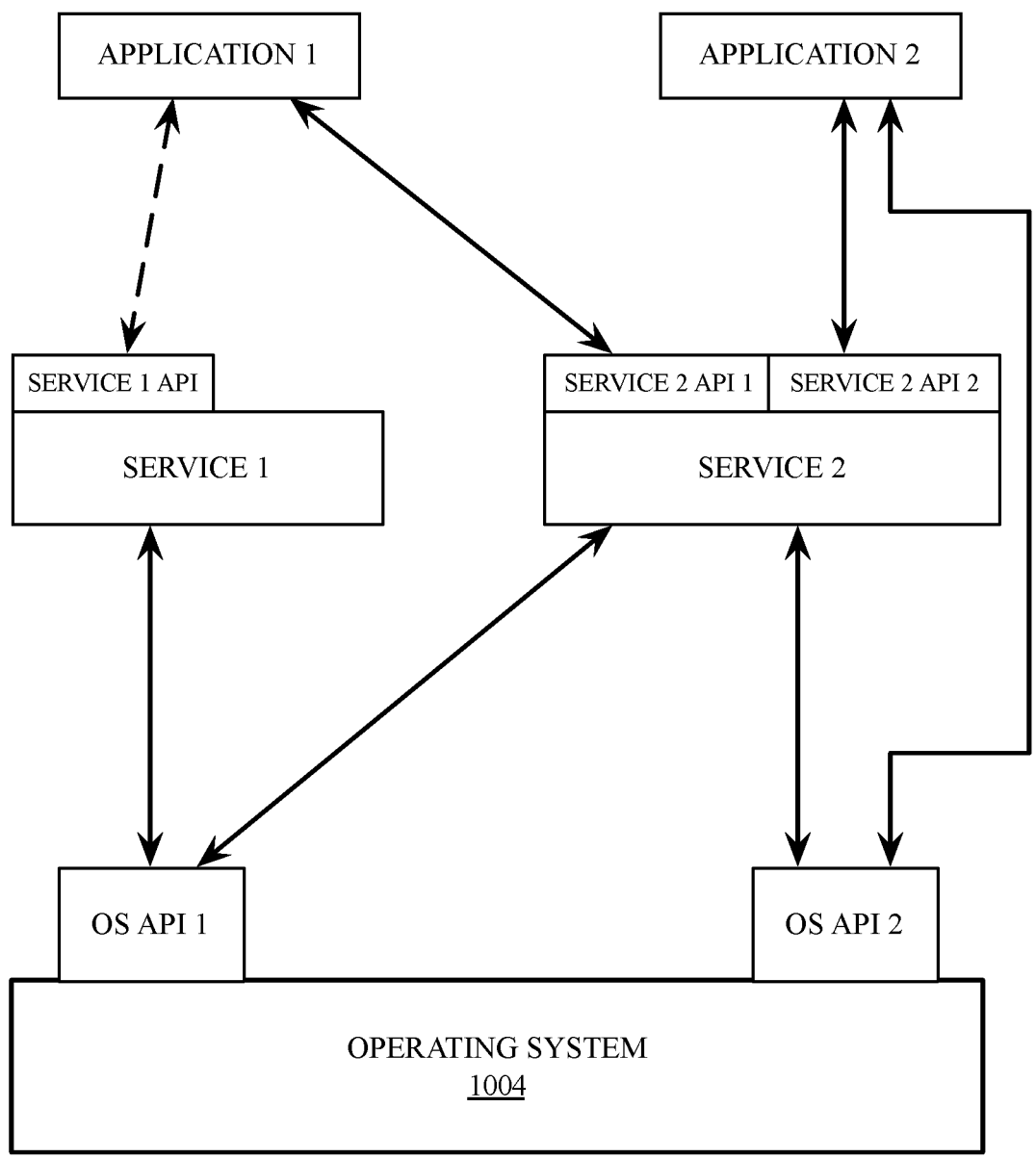

FIGS. 10A-10B are block diagrams of exemplary API software stacks 1000, 1010, according to embodiments. FIG. 10A shows an exemplary API software stack 1000 in which applications 1002 can make calls to Service A or Service B using Service API and to Operating System 1004 using an OS API. Additionally, Service A and Service B can make calls to Operating System 1004 using several OS APIs.

FIG. 10B shows an exemplary software stack 1010 including Application 1, Application 2, Service 1, Service 2, and Operating System 1004. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Additional Exemplary Computing Devices

Figure 11:
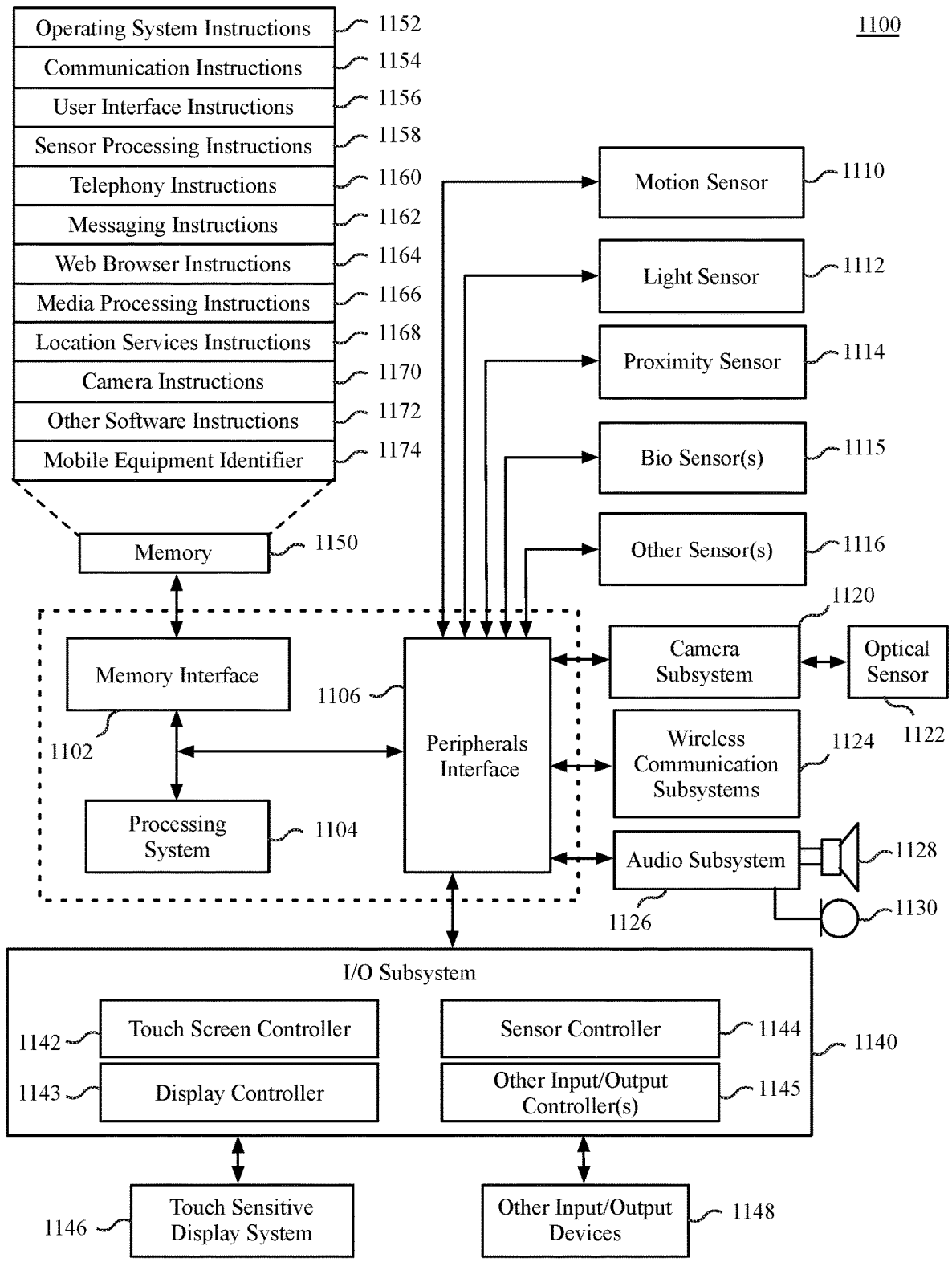
FIG. 11 is a block diagram of mobile device architecture, according to an embodiment.

FIG. 11 is a block diagram of a device architecture 1100 for a mobile or embedded device, according to an embodiment. The device architecture 1100 includes a memory interface 1102, a processing system 1104 including one or more data processors, image processors and/or graphics processing units, and a peripherals interface 1106. The various components can be coupled by one or more communication buses or signal lines. The various components can be separate logical components or devices or can be integrated in one or more integrated circuits, such as in a system on a chip integrated circuit.

The memory interface 1102 can be coupled to memory 1150, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate the mobile device functionality. One or more biometric sensor(s) 1115 may also be present, such as a fingerprint scanner for fingerprint recognition or an image sensor for facial recognition. Other sensors 1116 can also be connected to the peripherals interface 1106, such as a positioning system (e.g., GPS receiver), a temperature sensor, or other sensing device, to facilitate related functionalities. A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the wireless communication subsystems 1124 can depend on the communication network(s) over which a mobile device is intended to operate. For example, a mobile device including the illustrated device architecture 1100 can include wireless communication subsystems 1124 designed to operate over a GSM network, a CDMA network, an LTE network, a Wi-Fi network, a Bluetooth network, or any other wireless network. In particular, the wireless communication subsystems 1124 can provide a communications mechanism over which a media playback application can retrieve resources from a remote media server or scheduled events from a remote calendar or event server.

An audio subsystem 1126 can be coupled to a speaker 1128 and a microphone 1130 to facilitate voice-enabled functions, such as voice recognition, voice replication, digital recording, and telephony functions. In smart media devices described herein, the audio subsystem 1126 can be a high-quality audio system including support for virtual surround sound.

The I/O subsystem 1140 can include a touch screen controller 1142 and/or other input controller(s) 1145. For computing devices including a display device, the touch screen controller 1142 can be coupled to a touch sensitive display system 1146 (e.g., touch-screen). The touch sensitive display system 1146 and touch screen controller 1142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1146. Display output for the touch sensitive display system 1146 can be generated by a display controller 1143. In one embodiment the display controller 1143 can provide frame data to the touch sensitive display system 1146 at a variable frame rate.

In one embodiment a sensor controller 1144 is included to monitor, control, and/or processes data received from one or more of the motion sensor 1110, light sensor 1112, proximity sensor 1114, or other sensors 1116. The sensor controller 1144 can include logic to interpret sensor data to determine the occurrence of one of more motion events or activities by analysis of the sensor data from the sensors.

In one embodiment the I/O subsystem 1140 includes other input controller(s) 1145 that can be coupled to other input/control devices 1148, such as one or more buttons, rocker switches, thumb-wheel, infrared port, USB port, and/or a pointer device such as a stylus, or control devices such as an up/down button for volume control of the speaker 1128 and/or the microphone 1130.

In one embodiment, the memory 1150 coupled to the memory interface 1102 can store instructions for an operating system 1152, including portable operating system interface (POSIX) compliant and non-compliant operating system or an embedded operating system. The operating system 1152 may include instructions for handling basic system services and for performing hardware dependent tasks. In some implementations, the operating system 1152 can be a kernel.

The memory 1150 can also store communication instructions 1154 to facilitate communicating with one or more additional devices, one or more computers and/or one or more servers, for example, to retrieve web resources from remote web servers. The memory 1150 can also include user interface instructions 1156, including graphical user interface instructions to facilitate graphic user interface processing.

Additionally, the memory 1150 can store sensor processing instructions 1158 to facilitate sensor-related processing and functions; telephony instructions 1160 to facilitate telephone-related processes and functions; messaging instructions 1162 to facilitate electronic-messaging related processes and functions; web browser instructions 1164 to facilitate web browsing-related processes and functions; media processing instructions 1166 to facilitate media processing-related processes and functions; location services instructions including GPS and/or navigation instructions 1168 and Wi-Fi based location instructions to facilitate location based functionality; camera instructions 1170 to facilitate camera-related processes and functions; and/or other software instructions 1172 to facilitate other processes and functions, e.g., security processes and functions, and processes and functions related to the systems. The memory 1150 may also store other software instructions such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. A mobile equipment identifier, such as an International Mobile Equipment Identity (IMEI) 1174 or a similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions may be implemented in hardware and/or in software, including in one or more signal processing and/or application specific integrated circuits.

Figure 12:
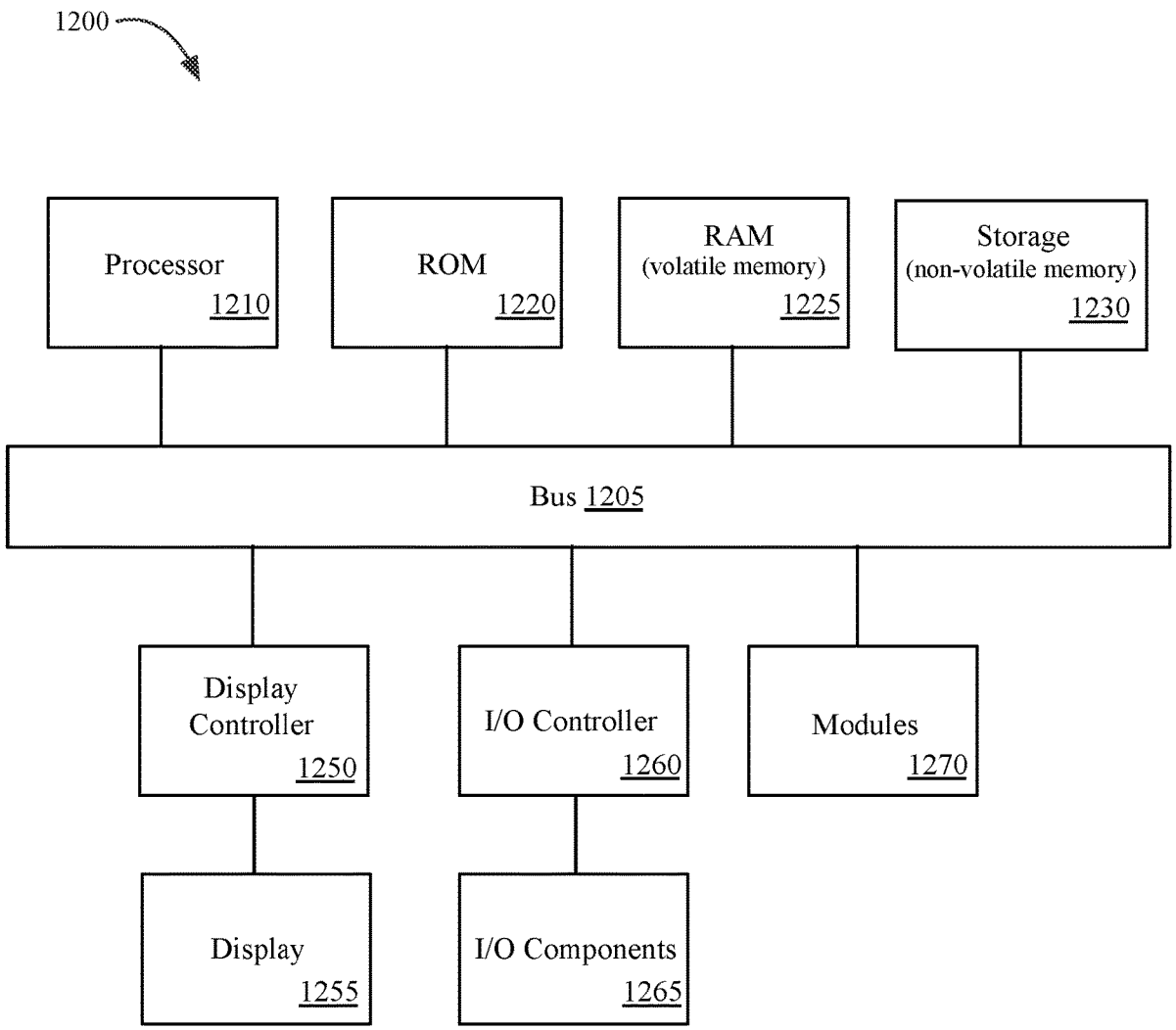
FIG. 12 is a block diagram illustrating an example computing system that can be used in conjunction with one or more of the embodiments of the disclosure.

FIG. 12 is a block diagram illustrating a computing system 1200 that can be used in conjunction with one or more of the embodiments described herein. The illustrated computing system 1200 can represent any of the devices or systems (e.g. client device 110, server 130) described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 can include a bus 1205 which can be coupled to a processor 1210, ROM 1220 (Read Only Memory), RAM 1225 (or volatile memory), and storage 1230 (or non-volatile memory). The processor 1210 can retrieve stored instructions from one or more of the memories (e.g., ROM 1220, RAM 1225, and storage 1230) and execute the instructions to perform processes, operations, or methods described herein. These memories represent examples of a non-transitory machine-readable medium (or computer-readable medium) or storage containing instructions which when executed by a computing system (or a processor), cause the computing system (or processor) to perform operations, processes, or methods described herein. The RAM 1225 can be implemented as, for example, dynamic RAM (DRAM), or other types of memory that require power continually in order to refresh or maintain the data in the memory. Non-volatile memory (e.g., storage 1230) can include, for example, magnetic, semiconductor, tape, optical, removable, non-removable, and other types of storage that maintain data even after power is removed from the system. It should be appreciated that the non-volatile memory can be remote from the system (e.g. accessible via a network).

A display controller 1250 can be coupled to the bus 1205 in order to receive display data to be displayed on a display device 1255, which can display any one of the user interface features or embodiments described herein and can be a local or a remote display device. The computing system 1200 can also include one or more input/output (I/O) components 1265 including mice, keyboards, touch screen, network interfaces, printers, speakers, and other devices. Typically, the input/output components 1265 are coupled to the system through an input/output controller 1260.

Modules 1270 can represent any of the functions or engines described above, including components, units, functions, or logic. Modules 1270 can reside, completely or at least partially, within the memories described above, or within a processor during execution thereof by the computing system. In addition, modules 1270 can be implemented as software, firmware, or functional circuitry within the computing system, or as combinations thereof.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide a predictive failure analysis method and service that enables design-time error and exception handling techniques to be supplemented or assisted by a predictive failure analysis system. In some embodiments, the predictive failure analysis system enables the dynamic injection of software routines into error and event handlers to enable the error and event handlers to respond to potential software failures without requiring software developers to have anticipated such errors at design time.

One embodiment provides an electronic device, comprising a non-transitory machine-readable medium to store instructions; one or more processors to execute the instructions; and a memory coupled to the one or more processors, the memory to store the instructions which, when executed by the one or more processors, cause the one or more processors to receive injection of dynamic error detection logic into the instructions, the dynamic error detection logic including a failure predictor to publish a failure prediction based on a stream of observed events on the electronic device.

One embodiment provides for a non-transitory machine-readable medium storing instructions which, when executed by one or more processors of an electronic device, cause the one or more processors to perform operations comprising storing an input event as a candidate for failure event analysis; detecting a predictive failure trend in stored input event log data; generating a plurality of predicted tables of failure knowledge data; mapping a predictive failure trend to the plurality of predicted tables; and issuing a failure event to an observer in response to detection of a match between the predictive failure trend and the failure knowledge data.

One embodiment provides for a data processing system comprising one or more processors; and a memory coupled to the one or more processors, the memory storing instructions which, when executed by the one or more processors, cause the data processing system to perform operations to receive injection of dynamic error detection logic into the instructions, the dynamic error handling logic including an error handling update to indicate a response to a predicted failure; receive a set of events indicative of the predicted failure; and respond to the set of events according to the error handling update.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An electronic device, comprising:
a non-transitory machine-readable medium to store instructions;
one or more processors to execute the instructions;
a memory coupled to the one or more processors, the memory to store the instructions which, when executed by the one or more processors, cause the one or more processors to:
receive injection of dynamic error handling logic into an error handler included within the instructions, wherein the dynamic error handling logic includes an error handling update to indicate a response to a predicted failure;
receive a set of events indicative of the predicted failure; and
respond to the set of events according to the error handling update.

2. The electronic device as in claim 1, the dynamic error handling logic provided by a predictive analysis module within a predictive failure analysis framework, the predictive analysis module and predictive failure analysis framework included in the instructions executed by the one or more processors.

3. The electronic device as in claim 2, the one or more processors to provide a subscription service to enable the predictive analysis module to subscribe to a stream of observable events.

4. The electronic device as in claim 3, the one or more processors to provide an observable application to output the stream of observable events.

5. The electronic device as in claim 3, the one or more processors to provide a publishing service to enable the predictive analysis module to publish the predicted failure.

6. The electronic device as in claim 5, the subscription service to enable an observer subscription to the predictive analysis module to receive the predicted failure via the publishing service and enable composition of an event pipeline from an observable application to an observer via one or more subjects, each subject including an observable and observer interface.

7. The electronic device as in claim 6, the one or more processors to provide an operator service, to enable the observer to compose, filter, select, or transform a stream of asynchronous observable failure events published by the predictive analysis module.

8. The electronic device as in claim 7, the predictive analysis module associated with a plugin failure predictor integrated via a plugin service.

9. The electronic device as in claim 8, the one or more processors to provide an authentication service to authenticate the plugin failure predictor.

10. The electronic device as in claim 9, the one or more processors to provide a discovery service to enable the observer to discover the plugin failure predictor.

11. The electronic device as in claim 10, wherein the predictive analysis module, via the one or more processors is configured to:
store an input event as a candidate for failure event analysis;
detect a predictive failure trend in stored input event log data;
generate a plurality of predicted tables of failure knowledge data;
map the predictive failure trend to the plurality of predicted tables; and
issue a failure event to the observer in response to detection of a match between the predictive failure trend and the failure knowledge data.

12. The electronic device as in claim 11, the predictive analysis module, via the one or more processors, is additionally to:
generate a plurality of explicit tables of failure knowledge data;
map the predictive failure trend to the plurality of explicit tables; and
issue a failure event to the observer in response to detection of a match between the predictive failure trend and an entry in one or more of the plurality of explicit tables.

13. A non-transitory machine-readable medium storing instructions which, when executed by one or more processors of an electronic device, cause the one or more processors to perform operations comprising:
storing an input event as a candidate for failure event analysis;
detecting a predictive failure trend in stored input event log data;
generating a plurality of predicted tables of failure knowledge data;
mapping the predictive failure trend to the plurality of predicted tables; and
issuing a failure event to an observer in response to detection of a match between the predictive failure trend and an entry in one or more of the plurality of predicted tables, wherein the observer includes an error handler to receive injection of dynamic error handling logic that includes an error handling update to indicate a response to a predicted failure associated with the predictive failure trend.

14. The non-transitory machine-readable medium as in claim 13, the operations additionally comprising:
generating a plurality of explicit tables of failure knowledge data;
mapping the predictive failure trend to the plurality of explicit tables; and
issuing a predicted failure event to the observer in response to detection of a match between the predictive failure trend and an entry in one or more of the plurality of explicit tables.

15. The non-transitory machine-readable medium as in claim 14, wherein the predicted failure event includes information related to a predicted failure.

16. The non-transitory machine-readable medium as in claim 15, wherein the information related to the predicted failure includes the error handling update.

17. A data processing system comprising:
one or more processors; and
a memory coupled to the one or more processors, the memory to store instructions for execution by the one or more processors to cause the data processing system to:
receive injection of dynamic error handling logic into an error handler included within the instructions, wherein the dynamic error handling logic including an error handling update to indicate a response to a predicted failure;
receive a set of events indicative of the predicted failure; and
respond to the set of events according to the error handling update.

18. The data processing system as in claim 17, wherein the dynamic error handling logic is provided by a predictive analysis module within a predictive failure analysis framework, the predictive analysis module and predictive failure analysis framework included in the instructions for execution by the one or more processors.

19. The data processing system as in claim 18, wherein the predictive analysis module, via the one or more processors is configured to:
store an input event as a candidate for failure event analysis;
detect a predictive failure trend in stored input event log data;
generate a plurality of predicted tables of failure knowledge data;
map a predicted failure event trend to the plurality of predicted tables; and
issue a failure event to an observer in response to detection of a match between the predictive failure trend and the failure knowledge data.

20. The data processing system as in claim 19, wherein the predictive analysis module, via the one or more processors, is additionally to:
generate a plurality of explicit tables of failure knowledge data;
map the predictive failure trend to the plurality of explicit tables; and
issue a failure event to an observer in response to detection of a match between the predictive failure trend and an entry in one or more of the plurality of explicit tables.

21. An electronic device, comprising:
a non-transitory machine-readable medium to store instructions;
one or more processors to execute the instructions;
a memory coupled to the one or more processors, the memory to store the instructions which, when executed by the one or more processors, cause the one or more processors to:
receive injection of dynamic error handling logic into the instructions, the dynamic error handling logic including an error handling update to indicate a response to a predicted failure, wherein the dynamic error handling logic is provided by a predictive analysis module associated with a subscription service and a publishing service and the subscription service is to enable an observer subscription to the predictive analysis module to receive the predicted failure via the publishing service;
receive a set of events indicative of the predicted failure; and
respond to the set of events according to the error handling update.

22. The electronic device as in claim 21, wherein the one or more processors are to receive injection of the dynamic error handling logic into an error handler included within the instructions, wherein the dynamic error handling logic is provided by a predictive analysis module within a predictive failure analysis framework included in the instructions.

23. The electronic device as in claim 22, wherein the subscription service is to further to enable the predictive analysis module to subscribe to a stream of observable events and enable composition of an event pipeline from an observable application to an observer via one or more subjects, each subject including an observable and observer interface.

24. The electronic device as in claim 22, wherein the one or more processors are further to provide an operator service, the operator service to enable the observer to compose, filter, select, or transform a stream of asynchronous observable failure events published by the predictive analysis module.

* * * * *